United States Patent
Iwai

(10) Patent No.: US 10,667,120 B2
(45) Date of Patent: May 26, 2020

(54) MOBILE COMMUNICATION SYSTEM, SERVICE PLATFORM, NETWORK PARAMETER CONTROL METHOD, AND NON-TRANSITORY COMPUTER READABLE MEDIUM

(71) Applicant: NEC Corporation, Tokyo (JP)

(72) Inventor: Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/767,945

(22) PCT Filed: Jan. 30, 2014

(86) PCT No.: PCT/JP2014/000487
§ 371 (c)(1),
(2) Date: Aug. 14, 2015

(87) PCT Pub. No.: WO2014/125780
PCT Pub. Date: Aug. 21, 2014

(65) Prior Publication Data
US 2015/0373528 A1    Dec. 24, 2015

(30) Foreign Application Priority Data
Feb. 15, 2013   (JP) ................................ 2013-028458

(51) Int. Cl.
*H04W 68/00* (2009.01)
*H04W 8/08* (2009.01)
(Continued)

(52) U.S. Cl.
CPC ............ *H04W 8/08* (2013.01); *H04L 43/065* (2013.01); *H04L 67/12* (2013.01); *H04W 4/70* (2018.02);
(Continued)

(58) Field of Classification Search
CPC ...................................................... H04W 8/08
See application file for complete search history.

(56) References Cited

U.S. PATENT DOCUMENTS 7,089,002 B2 * 8/2006 Wallentin .............. H04W 76/34
455/434
7,283,810 B1 10/2007 Arakawa et al.
(Continued)

FOREIGN PATENT DOCUMENTS

EP    2 515 562 A1    10/2012
EP    2 533 553 A1    12/2012
(Continued)

OTHER PUBLICATIONS

3GPP TS 22.368 V11.3.0, "Technical Specification Group Services and System Aspects; Service requirements for Machine-Type Communications (MTC); Stage 1", Release 11, pp. 1-24, Sep. 2011.
(Continued)

*Primary Examiner* — Michael T Vu
(74) *Attorney, Agent, or Firm* — Finnegan, Henderson, Farabow, Garrett & Dunner, L.L.P.

(57) ABSTRACT

A mobile communication system capable of executing optimization of network processing based on a change in utilization characteristics is provided. The mobile communication system according to the present invention includes a network operator device (12) that is arranged in a mobile communication network managed by a mobile communication provider and a service platform (13) that provides an application service for a mobile communication device (11), the mobile communication device performing communication via the mobile communication network. The service platform (13) transmits to the network operator device (12) a characteristic change in the mobile communication device (11) associated with an event notification transmitted from the mobile communication device (11) and the network
(Continued)

operator device (12) changes a network parameter associated with the mobile communication device (11) according to the characteristic change in the mobile communication device (11) transmitted from the service platform (13).

6 Claims, 25 Drawing Sheets

(51) Int. Cl.
    *H04W 24/02*     (2009.01)
    *H04L 12/26*     (2006.01)
    *H04W 4/70*     (2018.01)
    *H04L 29/08*     (2006.01)
    *H04W 72/04*     (2009.01)
    *H04L 12/24*     (2006.01)

(52) U.S. Cl.
    CPC ........... *H04W 24/02* (2013.01); *H04W 68/00* (2013.01); *H04W 72/0413* (2013.01); *H04L 41/0823* (2013.01); *H04L 41/0893* (2013.01)

(56) References Cited

U.S. PATENT DOCUMENTS

| | | | | |
|---|---|---|---|---|
| 8,365,146 | B2 * | 1/2013 | Tysowski | G06F 9/44505 709/220 |
| 9,401,842 | B2 * | 7/2016 | Rodermund | H04L 41/0806 |
| 2009/0180457 | A1 | 7/2009 | Shiga et al. | |
| 2009/0210075 | A1 | 8/2009 | Moriwaki | |
| 2010/0159954 | A1 * | 6/2010 | Rahman | H04W 4/02 455/456.3 |
| 2011/0131154 | A1 * | 6/2011 | Faber | G01C 21/32 705/418 |
| 2011/0264766 | A1 | 10/2011 | Ota et al. | |
| 2011/0269447 | A1 * | 11/2011 | Bienas | H04W 8/22 455/422.1 |
| 2013/0005387 | A1 | 1/2013 | Aso et al. | |
| 2013/0122910 | A1 * | 5/2013 | Singh | H04W 36/18 455/437 |
| 2013/0331063 | A1 * | 12/2013 | Cormier | H04L 63/0272 455/411 |

FOREIGN PATENT DOCUMENTS

| | | |
|---|---|---|
| JP | 2006-245665 | 9/2006 |
| JP | 2013-521709 | 6/2013 |
| WO | WO 00/55827 | 9/2000 |
| WO | WO 2006/090480 A1 | 8/2006 |
| WO | WO 2007/114150 A1 | 10/2007 |
| WO | WO 2010/055805 A1 | 5/2010 |
| WO | WO 2011/121921 A1 | 10/2011 |
| WO | WO 2012/111483 A1 | 8/2012 |
| WO | WO 2014/125776 A1 | 8/2014 |

OTHER PUBLICATIONS

International Search Report dated Mar. 18, 2014 in corresponding PCT International Application.
NEC Corporation et al., "Use Case on optimized M2M interworking with mobile networks (Optimizing mobility management parameters)", oneM2M-REQ-2013-0137-Use_Case_on_Mobile_Network_interworking-mobility.doc, retrieved from the internet: URL: URL =http://member.onem2m.org/Application/documentapp/downloadimmediate/default.aspx?docID=813 , pp. 1-8, Jan. 2013.
3GPP TS 22.368, V12.1.0, $3^{rd}$ Generation Partnership Project; Technical Specification Group Services and System Aspects; Service requirements for Machine-Type Communications (MTC); Stage 1 (Release 12), pp. 1-24, Dec. 2012.
Extended European Search Report dated Aug. 29, 2016, by the European Patent Office in counterpart European Patent Application No. 14752206.4.
Notice of Reasons for Refusal dated Dec. 5, 2017, issued by the Japanese Patent Office in counterpart Japanese Patent Application No. 2015-500132.
Notice of Decision to Grant, dated Oct. 29, 2019, issued in counterpart Japanese Patent Application No. 2019-000260.
"Evaluation of the Various Low Mobility Solutions", Motorola, 3GPP TSG SA WG2 Meeting #79, May 10-14, 2010, TD S2-102434, pp. 1-5.
Notice of Reasons for Refusal, dated May 15, 2018, issued in counterpart Japanese Patent Application No. 2015-500132.

* cited by examiner

| Use Case | MOVING CHARACTERISTICS | COMMUNICATION CHARACTERISTICS |
|---|---|---|
| ITS | RUNNING (MOVING), STOPPED (NOT MOVING) | NAVIGATION BEING USED (SHORT INTERVALS), NAVIGATION BEING STOPPED (LONG INTERVALS) |
| TRACEABILITY | DELIVERING (MOVING), DEPOT (NOT MOVING) | DELIVERING (SHORT INTERVALS), DEPOT (LONG INTERVALS) |
| HEALTH CARE | AWAY HOME (MOVING), HOME (NOT MOVING) | NO CHANGE |
| SECURITY | AWAY HOME (MOVING), HOME (NOT MOVING) | NO CHANGE |
| SMART METER | NO CHANGE (NOT MOVING) | NORMAL STATE (LONG INTERVALS), ABNORMAL STATE (SHORT INTERVALS) |
| AGRICULTURE | NO CHANGE (NOT MOVING) | NORMAL STATE (LONG INTERVALS), ABNORMAL STATE (SHORT INTERVALS) |
| PET | AWAY HOME (MOVING), HOME (NOT MOVING) | NORMAL STATE (LONG INTERVALS), ABNORMAL STATE (SHORT INTERVALS) |

Fig. 3

| CONTENT OF EVENTS | CONTENT OF CHARACTERISTIC CHANGE | |
|---|---|---|
| | CHARACTERISTIC TYPE | CONTENT |
| ENGINE STOP | MOVEMENT | STOP |
| ENGINE START | MOVEMENT | MOVEMENT START |
| NAVIGATION START | COMMUNICATION INTERVALS | FIVE MINUTES |
| NAVIGATION END | COMMUNICATION INTERVALS | ONE HOUR |

Fig. 7

| CONTENT OF CHARACTERISTIC CHANGE | | NW CONTROL POLICY | | |
|---|---|---|---|---|
| CHARACTERISTIC TYPE | CONTENT | NW PARAMETER | | SETTING CONTENT |
| MOVEMENT | MOVEMENT STOP | PAGING AREA | | CELL SIZE |
| | | LOCATION REGISTRATION INTERVALS | | THREE HOURS |
| MOVEMENT | MOVEMENT START | PAGING AREA | | PREFECTURE LEVEL |
| | | LOCATION REGISTRATION INTERVALS | | TEN MINUTES |

Fig. 9

EXAMPLES OF NW PARAMETERS OF HSS (1/2)

| NW PARAMETERS (SPECIFIC EXAMPLES OF 3GPP) | NW ASSIST INFORMATION |
|---|---|
| SUBSCRIBER IDENTIFIER (IMSI) | CHANGE IN SIM INFORMATION |
| TELEPHONE NUMBER (MSISDN) | CHANGE IN TELEPHONE NUMBER |
| TERMINAL IDENTIFIER (IMEI/IMEISV) | CHANGE IN TERMINAL IDENTIFIER |
| POLICY OF BLOCK/RESTRICTION OF COMMUNICATION (ODB parameters) | COMMUNICATION POLICY (SERVICE TO BE USED, SERVICE TO BE BLOCKED), CHARGING POLICY (UNPAID, ETC.) |
| POLICY OF BLOCK/RESTRICTION OF COMMUNICATION (Access Resriction) | COMMUNICATION POLICY (SERVICE TO BE USED, SERVICE TO BE BLOCKED) |
| CHARGING POLICY (EPS Subscribed Charging Characteristics) | CHARGING POLICY (normal, prepaid, flat-rate and/or hot billing suscription) |
| MAXIMUM COMMUNICATION BANDWIDTH ALLOCATED TO TERMINAL (Subscribed-UE-AMBR) | BANDWIDTH REQUIRED BY TERMINAL (Nmbps, MAXIMUM BANDWIDTH, MINIMUM BANDWIDTH) |
| CONNECTION DESTINATION NETWORK INFORMATION (APN-OI Replacement) | CONNECTION DESTINATION NW (CONNECTION DESTINATION MVNO, i-mode, sp-mode, ROAMING) |
| GROUP INFORMATION (CSG Subscription Data) | GROUP INFORMATION (TERMINAL GROUP THAT HAS BEEN CHANGED) |
| WHETHER OR NOT TRAFFIC OFFLOAD TECHNIQUE CAN BE USED (VPLMN LIPA Allowed) | WHETHER TRAFFIC OFFLOAD IS REQUIRED |
| LOCATION REGISTRATION INTERVALS (Subscribed Periodic RAU/TAU Timer) | MOVING CHARACTERISTIC (MOVING FREQUENCY) |
| PRIORITY OF VOICE SERVICE (MPS CS priority) | SERVICE PRIORITY (VOICE or DATA COMMUNICATION) |
| POLICY OF WIRELESS CONNECTION (UE-SRVCC-Capability) | PRIORITY OF NW TO BE USED (LTE or 3G or 2G) |

Fig. 16

EXAMPLES OF NW PARAMETERS OF HSS (2/2)

| NW PARAMETERS (SPECIFIC EXAMPLES OF 3GPP) | NW ASSIST INFORMATION |
|---|---|
| IP ADDRESS WHEN TERMINAL IS USED (PDN Address) | IP ADDRESS DESIRED TO BE USED |
| TYPE OF IP ADDRESS WHEN TERMINAL IS USED (PDN Type) | TYPE OF IP ADDRESS DESIRED TO BE USED (IPv4, IPv6, IPv4v6) |
| CONNECTION DESTINATION NW (APN-OI Replacement) | ADDITIONAL CONNECTION DESTINATION NW (CONNECTION DESTINATION MVNO, i-mode, sp-mode, ROAMING) |
| CONNECTION DESTINATION NW (Access Point Name : APN) | ADDITIONAL CONNECTION DESTINATION NW (CONNECTION DESTINATION MVNO, i-mode, sp-mode, ROAMING) |
| WHETHER TRAFFIC OFFLOAD TECHNIQUE FOR PDN CAN BE USED (SIPTO Permissions) | WHETHER TRAFFIC OFFLOAD IS REQUIRED |
| WHETHER TRAFFIC OFFLOAD TECHNIQUE FOR PDN CAN BE USED (LIPA Permissions) | WHETHER TRAFFIC OFFLOAD IS REQUIRED (CONNECTION TO Home NW) |
| QoS POLICY FOR PDN (EPS subscribed Qos profile) | BANDWIDTH REQUIRED BY TERMINAL (Nmbps, MAXIMUM BANDWIDTH, MINIMUM BANDWIDTH) |
| MAXIMUM AVAILABLE BANDWIDTH FOR PDN (Subscribed-APN-AMBR) | BANDWIDTH REQUIRED BY TERMINAL (Nmbps, MAXIMUM BANDWIDTH, MINIMUM BANDWIDTH) |
| CHARGING POLICY FOR PDN (EPS PDN Subscribed Charging Characteristics) | CHARGING POLICY (normal, prepaid, flat-rate, and/or hot billing suscription) |
| ROAMING POLICY FOR PDN (VPLMN Address Allowed) | WHETHER ROAMING IS REQUIRED |
| WHETHER MOBILITY IS REQUIRED IN TRAFFIC OFFLOAD (PDN GW Allocation Type) | SECURE MOBILITY IN TRAFFIC OFFLOAD |
| WHETHER VOICE CALL VIA DATA COMMUNICATION IS REQUIRED (Homogenous Support of IMS Over PS Sessions for MME) | WHETHER VOICE CALL VIA DATA COMMUNICATION (VoIte) IS REQUIRED |

Fig. 17

EXAMPLES OF NW PARAMETERS OF MME (1/3)

| NW PARAMETERS (SPECIFIC EXAMPLES OF 3GPP) | NW ASSIST INFORMATION |
|---|---|
| SUBSCRIBER IDENTIFIER (IMSI) | CHANGE THIS PARAMETER WHEN PARAMETER OF HSS IS CHANGED |
| TELEPHONE NUMBER (MSISDN) | CHANGE THIS PARAMETER WHEN PARAMETER OF HSS IS CHANGED |
| LOCATION REGISTRATION AREA (Tracking Area List) | MOVING CHARACTERISTIC (MOVING FREQUENCY) |
| AUTHENTICATION INFORMATION ON NETWORK (Authentication Vector) | WHEN AUTHENTICATION INFORMATION/ AUTHENTICATION METHOD IS CHANGED |
| INTERMITTENT RECEPTION INTERVALS (UE Specific DRX Parameters) | AMOUNT OF POWER CONSUMPTION, REMAINING AMOUNT OF BATTERY, AND COMMUNICATION FREQUENCY OF TERMINAL |
| WHETHER ENCRYPTION OF CONTROL MESSAGE IN NETWORK IS REQUIRED (Selected NAS Algorithm) | SECURITY LEVEL (HIGH, INTERMEDIATE, LOW) |
| CONNECTION RESTRICTION (Access Restriction) | SECURITY LEVEL (HIGH, INTERMEDIATE, LOW) |
| BLOCK POLICY FOR DATA (ODB for PS parameters) | COMMUNICATION POLICY (SERVICE TO BE USED, SERVICE TO BE BLOCKED) |
| CONNECTION DESTINATION NW (APN-OI Replacement) | CHANGE THIS PARAMETER WHEN PARAMETER OF HSS IS CHANGED |
| MAXIMUM COMMUNICATION BANDWIDTH ALLOCATED TO TERMINAL (Subscribed-UE-AMBR, UE-AMBR) | CHANGE THIS PARAMETER WHEN PARAMETER OF HSS IS CHANGED |
| CHARGING POLICY (EPS Subscribed Charging Characteristics) | CHANGE THIS PARAMETER WHEN PARAMETER OF HSS IS CHANGED |
| TRACE INFORMATION (Trace reference) | CHANGE THIS PARAMETER WHEN PARAMETER OF HSS IS CHANGED |
| TRACE TYPE (Trace type) | CHANGE THIS PARAMETER WHEN PARAMETER OF HSS IS CHANGED |
| GROUP INFORMATION (CSG-Subscription Data) | CHANGE THIS PARAMETER WHEN PARAMETER OF HSS IS CHANGED |

Fig. 18

EXAMPLES OF NW PARAMETERS OF MME (2/3)

| NW PARAMETERS (SPECIFIC EXAMPLES OF 3GPP) | NW ASSIST INFORMATION |
|---|---|
| WHETHER TRAFFIC OFFLOAD TECHNIQUE FOR PDN CAN BE USED (LIPA Allowed) | CHANGE THIS PARAMETER WHEN PARAMETER OF HSS (VPLMN LIPA ALLOWED OR LIPA permissions) IS CHANGED |
| LOCATION REGISTRATION INTERVALS (Subscribed Periodic RAU/TAU Timer) | CHANGE THIS PARAMETER WHEN PARAMETER OF HSS IS CHANGED |
| PRIORITY OF VOICE SERVICE (MPS CS priority) | CHANGE THIS PARAMETER WHEN PARAMETER OF HSS IS CHANGED |
| MPS/EPS PRIORITY (MPS EPS priority) | CHANGE THIS PARAMETER WHEN PARAMETER OF HSS IS CHANGED |
| APN TO BE USED (APN in Use) | CHANGE THIS PARAMETER WHEN PARAMETER OF HSS IS CHANGED |
| RESTRICTION OF APN TO BE USED (APN Restriction) | CHANGE THIS PARAMETER WHEN PARAMETER OF HSS IS CHANGED |
| TYPE OF IP ADDRESS WHEN TERMINAL IS USED (PDN Type) | CHANGE THIS PARAMETER WHEN PARAMETER OF HSS IS CHANGED |
| IP ADDRESS WHEN TERMINAL IS USED (IP Address(es)) | CHANGE THIS PARAMETER WHEN PARAMETER OF HSS (PDN Address) IS CHANGED |
| CHARGING POLICY FOR PDN (EPS PDN Charging Characteristics) | CHANGE THIS PARAMETER WHEN PARAMETER OF HSS IS CHANGED |
| CONNECTION DESTINATION NW (APN-OI Replacement) | CHANGE THIS PARAMETER WHEN PARAMETER OF HSS IS CHANGED |
| WHETHER TRAFFIC OFFLOAD TECHNIQUE FOR PDN CAN BE USED (SIPTO Permissions) | CHANGE THIS PARAMETER WHEN PARAMETER OF HSS IS CHANGED |
| WHETHER TRAFFIC OFFLOAD TECHNIQUE FOR PDN CAN BE USED (LIPA Permissions) | CHANGE THIS PARAMETER WHEN PARAMETER OF HSS IS CHANGED |
| ROAMING POLICY FOR PDN (VPLMN Address Allowed) | CHANGE THIS PARAMETER WHEN PARAMETER OF HSS IS CHANGED |

Fig. 19

EXAMPLES OF NW PARAMETERS OF MME (3/3)

| NW PARAMETERS (SPECIFIC EXAMPLES OF 3GPP) | NW ASSIST INFORMATION |
|---|---|
| WHETHER NW INFORMATION NOTIFICATION COLLECTED BY NODE IS REQUIRED (MS info Change Reporting Action) | BANDWIDTH REQUIRED BY TERMINAL (Nmbps, MAXIMUM BANDWIDTH, MINIMUM BANDWIDTH) |
| WHETHER CSG INFORMATION NOTIFICATION IS REQUIRED (CSG Information Reporting Action) | CHANGE THIS PARAMETER WHEN PARAMETER OF HSS (CSG Subscription Data) IS CHANGED |
| QoS POLICY FOR PDN (EPS subscribed Qos profile) | CHANGE THIS PARAMETER WHEN PARAMETER OF HSS IS CHANGED |
| MAXIMUM AVAILABLE BANDWIDTH FOR PDN (Subscribed-APN-AMBR) | CHANGE THIS PARAMETER WHEN PARAMETER OF HSS IS CHANGED |
| MAXIMUM AVAILABLE BANDWIDTH FOR APN (APN-AMBR) | CHANGE THIS PARAMETER WHEN PARAMETER OF HSS (Subscribed-APN-AMBR) IS CHANGED |
| PRIORITY OF CONNECTION (low access priority) | PRIORITY OF COMMUNICATION |
| QoS ALLOCATED TO EPS (EPS bearer Qos) | CHANGE THIS PARAMETER WHEN PARAMETER OF HSS (EPS subscribed QoS profile) IS CHANGED |
| USE OF EMERGENCY COMMUNICATION (Emergency Access Point Name, Emergency QoS profile, Emergency PDN GW identity, Non-3GPP HO Emergency PDN GW identity) | WHETHER EMERGENCY COMMUNICATION IS REQUIRED |

Fig. 20

EXAMPLES OF NW PARAMETERS OF S-GW

| NW PARAMETERS (SPECIFIC EXAMPLES OF 3GPP) | NW ASSIST INFORMATION |
|---|---|
| SUBSCRIBER IDENTIFIER (IMSI) | CHANGE THIS PARAMETER WHEN PARAMETER OF HSS IS CHANGED |
| TERMINAL IDENTIFIER (ME Identity) | CHANGE THIS PARAMETER WHEN PARAMETER OF HSS IS CHANGED |
| TELEPHONE NUMBER (MSISDN) | CHANGE THIS PARAMETER WHEN PARAMETER OF HSS IS CHANGED |
| OPERATOR IDENTIFIER (Selected CN operator id) | CHANGE THIS PARAMETER WHEN PARAMETER OF HSS IS CHANGED |
| TRACE INFORMATION (Trace reference) | CHANGE THIS PARAMETER WHEN PARAMETER OF HSS IS CHANGED |
| TRACE TYPE (Trace type) | CHANGE THIS PARAMETER WHEN PARAMETER OF HSS IS CHANGED |
| OMC IDENTIFIER (OMC identity) | CHANGE THIS PARAMETER WHEN PARAMETER OF HSS IS CHANGED |
| APN TO BE USED (APN in Use) | CHANGE THIS PARAMETER WHEN PARAMETER OF HSS IS CHANGED |
| CHARGING POLICY FOR PDN (EPS PDN Charging Characteristics) | CHANGE THIS PARAMETER WHEN PARAMETER OF HSS IS CHANGED |
| QoS ALLOCATED TO EPS (EPS Bearer QoS) | CHANGE THIS PARAMETER WHEN PARAMETER OF HSS (EPS subscribed QoS profile) IS CHANGED |
| CHARGING ID (Charging id) | CHANGE THIS PARAMETER WHEN PARAMETER OF HSS IS CHANGED |

Fig. 21

EXAMPLES OF NW PARAMETERS OF P-GW (1/2)

| NW PARAMETERS (SPECIFIC EXAMPLES OF 3GPP) | NW ASSIST INFORMATION |
|---|---|
| SUBSCRIBER IDENTIFIER (IMSI) | CHANGE THIS PARAMETER WHEN PARAMETER OF HSS IS CHANGED |
| TERMINAL IDENTIFIER (ME Identity) | CHANGE THIS PARAMETER WHEN PARAMETER OF HSS IS CHANGED |
| TELEPHONE NUMBER (MSISDN) | CHANGE THIS PARAMETER WHEN PARAMETER OF HSS IS CHANGED |
| OPERATOR IDENTIFIER (Selected CN operator id) | CHANGE THIS PARAMETER WHEN PARAMETER OF HSS IS CHANGED |
| TRACE INFORMATION (Trace reference) | CHANGE THIS PARAMETER WHEN PARAMETER OF HSS IS CHANGED |
| TRACE TYPE (Trace type) | CHANGE THIS PARAMETER WHEN PARAMETER OF HSS IS CHANGED |
| APN TO BE USED (APN in Use) | CHANGE THIS PARAMETER WHEN PARAMETER OF HSS IS CHANGED |
| MAXIMUM AVAILABLE BANDWIDTH FOR APN (APN-AMBR) | CHANGE THIS PARAMETER WHEN PARAMETER OF HSS (Subscribed-APN-AMBR) IS CHANGED |
| IP ADDRESS WHEN TERMINAL IS USED (IP Address) | CHANGE THIS PARAMETER WHEN PARAMETER OF HSS (PDN Address) IS CHANGED |

Fig. 22

EXAMPLES OF NW PARAMETERS OF P-GW (2/2)

| NW PARAMETERS (SPECIFIC EXAMPLES OF 3GPP) | NW ASSIST INFORMATION |
|---|---|
| TYPE OF IP ADDRESS WHEN TERMINAL IS USED (PDN type) | CHANGE THIS PARAMETER WHEN PARAMETER OF HSS IS CHANGED |
| INSTRUCTION OF NOTIFICATION OF NW INFORMATION COLLECTED BY NODE (MS info Change Reporting support indication) | CHANGE THIS PARAMETER WHEN PARAMETER OF HSS IS CHANGED |
| WHETHER NOTIFICATION OF NW INFORMATION COLLECTED BY NODE IS REQUIRED (MS info Change Reporting Action) | CHANGE THIS PARAMETER WHEN PARAMETER OF HSS IS CHANGED |
| WHETHER CSG INFORMATION NOTIFICATION IS REQUIRED (CSG Information Reporting Action) | CHANGE THIS PARAMETER WHEN PARAMETER OF HSS IS CHANGED |
| CHARGING POLICY FOR PDN (EPS PDN Charging Characteristics) | CHANGE THIS PARAMETER WHEN PARAMETER OF HSS IS CHANGED |
| QoS ALLOCATED TO EPS (EPS Bearer QoS) | CHANGE THIS PARAMETER WHEN PARAMETER OF HSS (EPS subscribed QoS profile) IS CHANGED |
| CHARGING ID (Charging id) | CHANGE THIS PARAMETER WHEN PARAMETER OF HSS IS CHANGED |

Fig. 23

EXAMPLES OF NW PARAMETERS OF UE (1/2)

| NW PARAMETERS (SPECIFIC EXAMPLES OF 3GPP) | NW ASSIST INFORMATION |
|---|---|
| SUBSCRIBER IDENTIFIER (IMSI) | CHANGE THIS PARAMETER WHEN PARAMETER OF HSS IS CHANGED |
| TERMINAL IDENTIFIER (ME Identity) | CHANGE THIS PARAMETER WHEN PARAMETER OF HSS IS CHANGED |
| LOCATION REGISTRATION AREA (Tracking Area List) | CHANGE THIS PARAMETER WHEN PARAMETER OF MME IS CHANGED |
| SECURITY POLICY SELECTED BY NAS (Selected NAS Algorithm) | CHANGE THIS PARAMETER WHEN PARAMETER OF MME IS CHANGED |
| SECURITY POLICY SELECTED BY AS (Selected AS Algorithm) | SECURITY LEVEL BETWEEN APPLICATIONS (HIGH, INTERMEDIATE, LOW) |
| TEMPORARY ALLOCATED IDENTIFIER (Temporary Identity used in Next Update) | SECURITY LEVEL OF NW (HIGH, INTERMEDIATE, LOW) |
| DRX TIMER (UE Specific DRX Parameters) | CHANGE THIS PARAMETER WHEN PARAMETER OF MME IS CHANGED |
| ALLOCATED CSG LIST (Allowed CSG list) | CHANGE THIS PARAMETER WHEN PARAMETER OF HSS (CSG Subscription Data) IS CHANGED |

Fig. 24

EXAMPLES OF NW PARAMETERS OF UE (2/2)

| NW PARAMETERS (SPECIFIC EXAMPLES OF 3GPP) | NW ASSIST INFORMATION |
|---|---|
| OPERATOR CSG LIST (Operator CSG list) | CHANGE THIS PARAMETER WHEN PARAMETER OF HSS (CSG Subscription Data) IS CHANGED |
| CONNECTION DESTINATION NETWORK INFORMATION (APN in Use) | ADDITIONAL CONNECTION DESTINATION NW (CONNECTION DESTINATION MVNL, i-mode, sp-mode, ROAMING) |
| MAXIMUM AVAILABLE BANDWIDTH FOR APN (APN-AMBR) | CHANGE THIS PARAMETER WHEN PARAMETER OF HSS (Subscribed-APN-AMBR) IS CHANGED |
| IP ADDRESS DESIRED TO BE USED (Assigned PDN Type) | TYPE OF IP ADDRESS DESIRED TO BE USED (IPv4, IPv6, IPv4v6) |
| TYPE OF IP ADDRESS DESIRED TO BE USED (IP Address(es)) | IP ADDRESS DESIRED TO BE USED |
| QoS ALLOCATED TO EPS (EPS Bearer QoS) | CHANGE THIS PARAMETER WHEN PARAMETER OF HSS (EPS subscribed QoS profile) IS CHANGED |

Fig. 25

MOBILE COMMUNICATION SYSTEM, SERVICE PLATFORM, NETWORK PARAMETER CONTROL METHOD, AND NON-TRANSITORY COMPUTER READABLE MEDIUM

CROSS-REFERENCE TO RELATED PATENT APPLICATIONS

This application is a National Stage Entry of International Application No. PCT/JP2014/000487, filed Jan. 30, 2014, which claims priority from Japanese Patent Application No. 2013-028458, filed Feb. 15, 2013. The entire contents of the above-referenced applications are expressly incorporated herein by reference.

TECHNICAL FIELD

The present invention relates to a mobile communication system that determines a control content based on an event content regarding which a notification is sent from a mobile communication device.

BACKGROUND ART

In recent years, a method for optimizing setting of each processing node forming a mobile communication system has been required. In the 3GPP, a method for optimizing network processing according to utilization characteristics of a mobile communication terminal has been proposed (Non-Patent Literature 1). For example, for a terminal fixedly installed in a specific location, network processing may be executed to reduce control processing regarding a movement. Specifically, the intervals at which the terminal executes location registration may be set longer than a predetermined period of time. Further, when the mobile communication terminal is a terminal that permits a delay, network processing may be executed to transmit data to a mobile terminal in such a way as to control communication time to avoid the timing at which the amount of data to be transmitted and received becomes the largest.

CITATION LIST

Non Patent Literature

[Non-Patent Literature 1] 3GPP TS 22.368 V11.3.0 (2011-09) 3rd Generation Partnership Project; Technical Specification Group Services and System Aspects; Service requirements for Machine-Type Communications (MTC); Stage 1 (Release 11)

SUMMARY OF INVENTION

Technical Problem

However, as described above, the optimization of the network processing is executed for a mobile terminal whose utilization characteristics are fixed. For example, whether the terminal is fixedly installed in a specific location or permits a delay is determined using predetermined terminal information, predetermined terminal service information or the like. It is now required to execute, in addition to the optimization of the network processing stated above, optimization of network processing for a mobile terminal whose utilization characteristics change. It is therefore required to execute optimization of the network processing using information other than service information or the like which generally changes less frequently.

One exemplary object of the present invention is to provide a mobile communication system, a service platform, a network parameter control method, and a program that solve the aforementioned problem.

Solution to Problem

A mobile communication system according to a first exemplary aspect of the present invention is a mobile communication system including a network operator device arranged in a mobile communication network managed by a mobile communication provider and a service platform that provides an application service for a mobile communication device, the mobile communication device performing communication via the mobile communication network, in which the service platform transmits to the network operator device a characteristic change in the mobile communication device associated with an event notification transmitted from the mobile communication device, and the network operator device changes a network parameter associated with the mobile communication device according to the characteristic change in the mobile communication device transmitted from the service platform.

A service platform according to a second exemplary aspect of the present invention is a service platform that provides an application service for a mobile communication device connected to a mobile communication network managed by a mobile communication provider, in which the service platform includes an event information acquisition unit that receives an event notification transmitted from the mobile communication device and a characteristic change detection unit that transmits a characteristic change in the mobile communication device associated with the event notification transmitted from the mobile communication device to a network operator device arranged in the mobile communication network.

A network operator device according to a third exemplary aspect of the present invention is a network operator device that communicates with a service platform, the service platform providing an application service to a mobile communication device connected to a mobile communication network managed by a mobile communication provider, in which the network operator device includes a communication unit that receives from the service platform a characteristic change in the mobile communication device associated with an event notification transmitted from the mobile communication device and a network parameter controller that changes a network parameter associated with the mobile communication device according to the characteristic change in the mobile communication device transmitted from the service platform.

A network parameter control method according to a fourth exemplary aspect of the present invention includes receiving an event notification transmitted from a mobile communication device that belongs to a mobile communication network managed by a mobile communication provider, transmitting a characteristic change in the mobile communication device associated with the event notification, and changing a network parameter associated with the mobile communication device according to the characteristic change in the mobile communication device.

A program according to a fifth exemplary aspect of the present invention is a program for causing a computer that provides an application service for a mobile communication device connected to a mobile communication network managed by a mobile communication provider to execute the following steps of: receiving an event notification transmitted from the mobile communication device; and transmitting a characteristic change in the mobile communication device associated with the event notification transmitted from the mobile communication device to a network operator device arranged in the mobile communication network.

Advantageous Effects of Invention

According to the present invention, it is possible to provide a mobile communication system, a service platform, a network parameter control method, and a program capable of executing optimization of network processing based on changes in utilization characteristics.

BRIEF DESCRIPTION OF DRAWINGS

FIG. 3 is a diagram describing characteristic changes according to the second exemplary embodiment;
FIG. 7 is a diagram for describing a database in which a content of an event and a content of the characteristic change are associated with each other according to the second exemplary embodiment;
FIG. 9 is a diagram for describing a database in which a content of the characteristic change and an NW parameter are associated with each other according to the second exemplary embodiment;
FIG. 16 is a diagram showing network parameters held by an HSS according to the seventh exemplary embodiment;
FIG. 17 is a diagram showing network parameters held by the HSS according to the seventh exemplary embodiment;
FIG. 18 is a diagram showing network parameters held by an MME according to the seventh exemplary embodiment;
FIG. 19 is a diagram showing network parameters held by the MME according to the seventh exemplary embodiment;
FIG. 20 is a diagram showing network parameters held by the MME according to the seventh exemplary embodiment;
FIG. 21 is a diagram showing network parameters held by an S-GW according to the seventh exemplary embodiment;
FIG. 22 is a diagram showing network parameters held by a P-GW according to the seventh exemplary embodiment;
FIG. 23 is a diagram showing network parameters held by the P-GW according to the seventh exemplary embodiment;
FIG. 24 is a diagram showing network parameters held by a UE according to the seventh exemplary embodiment;
FIG. 25 is a diagram showing network parameters held by the UE according to the seventh exemplary embodiment.

DESCRIPTION OF EMBODIMENTS

First Exemplary Embodiment

Figure 1:
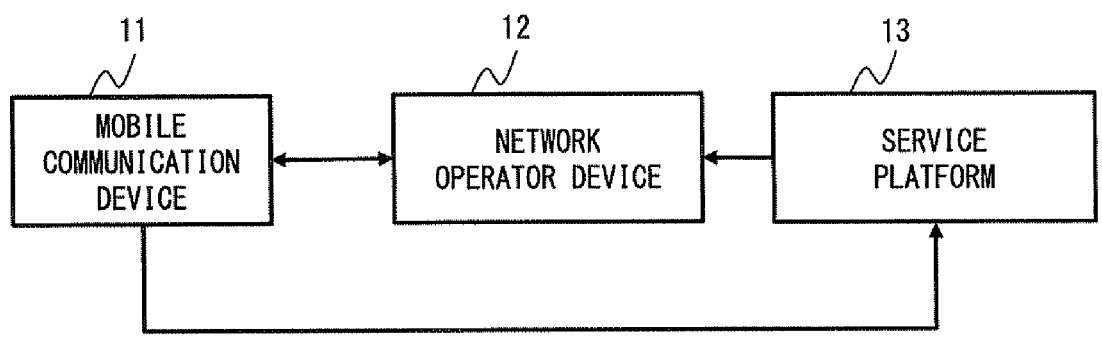
FIG. 1 is a configuration diagram of a mobile communication system according to a first exemplary embodiment.

Hereinafter, with reference to the drawings, exemplary embodiments of the present invention will be described. With reference to FIG. 1, a configuration example of a mobile communication system according to a first exemplary embodiment of the present invention will be described. The mobile communication system in FIG. 1 includes a mobile communication device 11, a network operator device 12, and a service platform 13.

The mobile communication device 11 may be a mobile telephone terminal, a smartphone terminal, a notebook personal computer or the like, moving means such as an automobile, a train or the like in which a communication function is installed, or a device such as a machine like a watch that is worn by a user in which a communication function is installed. The mobile communication device 11 may be a device that does not often move such as an automatic vending machine or an electrical appliance having a communication function.

The service platform 13 provides application services for the mobile communication device 11 that performs communication via a mobile communication network managed by a mobile communication provider. Further, the service platform 13 transmits to the network operator device 12 network assist information used to change network parameters associated with the mobile communication device 11 in association with information on a state change in the mobile communication device 11 regarding which a notification has been sent from the mobile communication device 11. In another example, the service platform 13 may analyze data that the mobile communication device 11 transmits to or receives from a server device, a mobile communication device or the like with which the mobile communication device 11 communicates to generate the network assist information.

The mobile communication device 11 notifies the service platform 13 of the information on the state change when, for example, there is a change in an operation state, a communication state, a moving state of the mobile communication device 11 or data held in the mobile communication device 11. The mobile communication device 11 may notify the service platform 13 of the information on the state change in the mobile communication device 11 as an event notification. More specifically, when the mobile communication device 11 is an automobile, the mobile communication device 11 may notify the service platform 13 of a state of an engine as the event notification when the engine is turned on or turned off. In this way, the information related to a movement of the mobile communication device 11 may be referred to as mobility information. In another example, when the mobile communication device 11 includes a sensor, the mobile communication device 11 may notify the service platform 13 of information detected by the sensor as the event notification. The information detected by the mobile communication device 11 using the sensor may be called connectivity information.

In another example, the mobile communication device 11 may notify the service platform 13 of a change in a battery capacity of the mobile communication device 11. In another example, the mobile communication device 11 may notify the service platform 13 of information on an application installed in the mobile communication device 11.

The service platform 13 may receive information on the state change in the mobile communication device 11 from a device other than the mobile communication device 11. The service platform 13 may receive information on the state change in the mobile communication device 11 from, for example, a monitoring server or the like that monitors the state of the mobile communication device 11. The service platform 13 may receive, for example, information on a radio wave state from a monitoring server or the like that monitors the radio wave state at a location of the mobile communication device 11.

The network assist information is information used to adjust and optimize the network parameters managed by the network operator device 12. The network parameters are associated with the mobile communication device 11. Further, the network parameters are information and policies that allow each node device in the network to determine processing of the mobile communication device 11. The information and the policies to determine the processing of the mobile communication device 11 may be, for example, a telephone number, a QoS policy or the like. Each node device may be, for example, a base station, a core network device or the like in the mobile communication network. Next, the details of the network assist information will be described. The network assist information is, for example, information indicating moving characteristics and communication characteristics of the mobile communication device 11 or a state change in the mobile communication device 11. The network assist information further includes various types of information as information used to change the network parameters associated with the mobile communication device 11. The change in the moving characteristics may indicate that the state of the mobile communication device 11 has been changed from a state in which it moves to a state in which it is stopped. In another example, the change in the moving characteristics may indicate that the state of the mobile communication device 11 has been changed from a state in which it moves at a high speed to a state in which it moves at a low speed. The high speed may indicate, for example, the speed when a user of the mobile communication device 11 moves with a car or the like and the low speed may indicate, for example, the speed when the user of the mobile communication device 11 moves by foot. Otherwise, a threshold regarding the speed may be determined in advance, and it may be determined that the mobile communication device 11 moves at a high speed when the moving speed exceeds the threshold and may be determined that it moves at a low speed when the moving speed is below the threshold. In another example, the change in the moving characteristics may indicate that the state of the mobile communication device 11 has been changed from a state in which a frequency of the movement is high to a state in which a frequency of the movement is low. The frequency of the movement may be determined to be high when the number of times of movement exceeds a predetermined frequency and the frequency of the movement may be determined to be low when the number of times of movement is below the predetermined frequency. In another example, the change in the moving characteristics may indicate a change in a moving direction, a moving speed or the like. The information indicating the moving characteristics may be referred to as a mobility state.

The change in the communication characteristics may indicate that the amount of data transmitted from the mobile communication device 11 has been changed. In another example, the change in the communication characteristics may indicate that a communication band that the mobile communication device 11 requires has been changed. In another example, the change in the communication characteristics may indicate that the delay allowed by the mobile communication device 11 has been changed. In another example, the change in the communication characteristics may indicate that the intervals at which the mobile communication device 11 performs communication have been changed. The information indicating the communication characteristics may be referred to as a connectivity state.

The state change in the mobile communication device 11 may indicate, for example, a change in an amount of power consumption, a remaining amount of battery, or a charging state of the mobile communication device 11. In another example, the state change in the mobile communication device 11 may indicate, for example, an application that is currently running on the mobile communication device 11, end time of the application that is being activated, a predicted start time of the application or the like. In another example, the state change in the mobile communication device 11 may indicate, for example, a radio wave state or the like between the mobile communication device 11 and a base station or the like that performs radio communication with the mobile communication device 11.

Further, the network assist information may be information indicating a change in needs of a user of the mobile communication device 11. The information indicating the change in needs of the user of the mobile communication device 11 includes, for example, a change in a charging plan or a change in an IP address to be used.

The network assist information may further include information that indicates network processing.

The network operator device 12 is arranged in the mobile communication network managed by the mobile communication provider. Further, the network operator device 12 changes the network parameters associated with the mobile communication device 11 according to the network assist information on the mobile communication device 11 regarding which a notification has been sent from the service platform 13. The network parameters may be information on an area where the mobile communication device 11 is called when incoming call processing for the mobile communication device 11 is performed. In another example, the network parameters may be information on a timing for disconnecting the mobile communication device 11 from the mobile communication network.

In general, the information on the event notification regarding which a notification is sent from the mobile communication device 11 passes through the mobile communication network and is then sent to an external device such as an application service provider. Therefore, the network operator device 12 cannot change the network parameters according to the event notification of the mobile communication device 11.

Meanwhile, with the use of the mobile communication system shown in FIG. 1, the network operator device 12 is able to acquire the network assist information associated with the event notification via the service platform 13. That is, the network operator device 12 is able to acquire the network assist information associated with various event notifications. The network operator device 12 is therefore able to set appropriate network parameters corresponding to various types of characteristic changes. It is therefore possible to achieve, for example, an efficient use of resources in the mobile communication network.

Second Exemplary Embodiment

Figure 2:
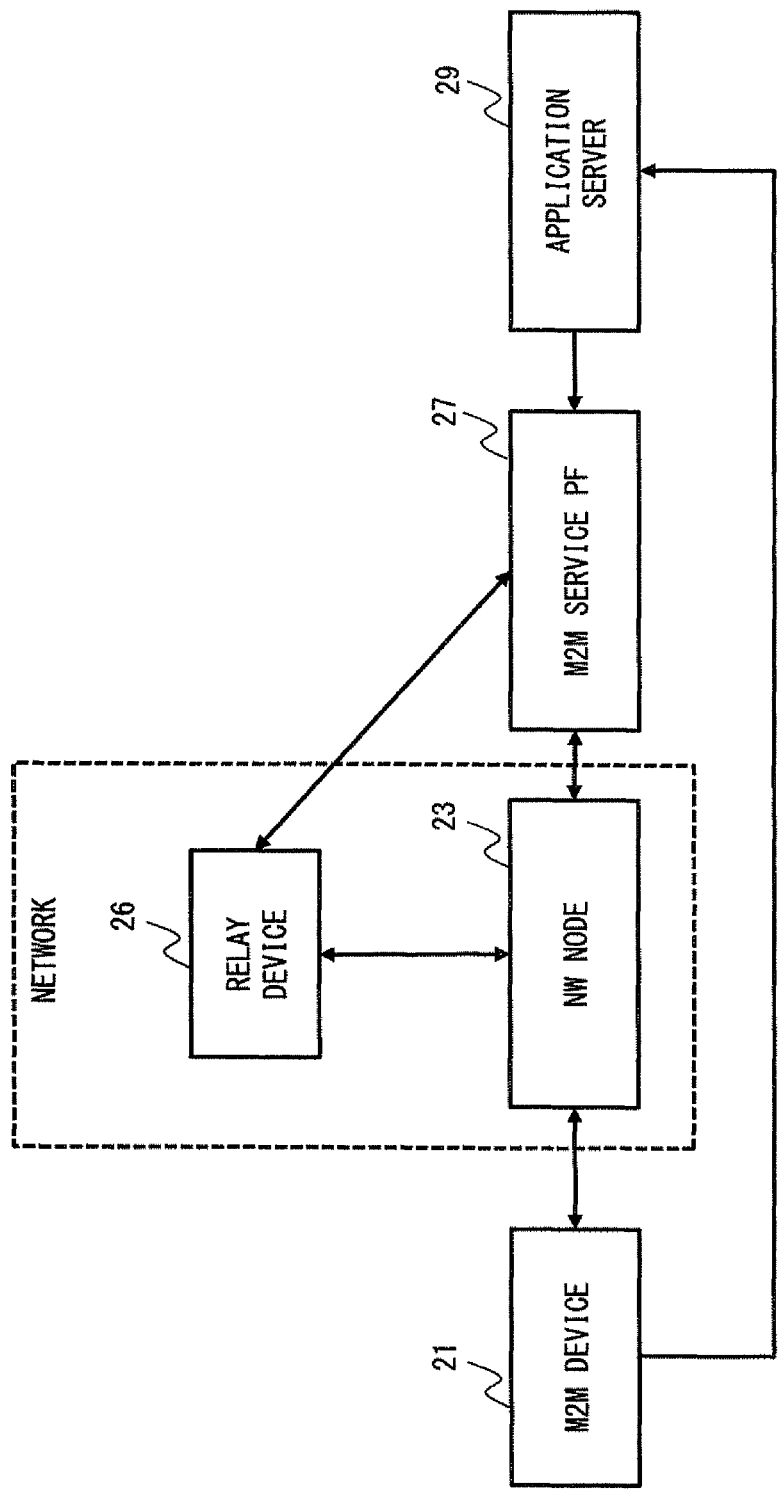
FIG. 2 is a configuration diagram of a mobile communication system according to a second exemplary embodiment.

Next, with reference to FIG. 2, a configuration example of a mobile communication system according to a second exemplary embodiment of the present invention will be described. While a Machine to Machine (M2M) communication will be mainly described in the following description, the present invention is not limited to being applied to the M2M communication and may also be applied to general communications or the like. The mobile communication system shown in FIG. 2 includes a Machine to Machine (M2M) device 21, an NW node 23, a relay device 26, an M2M service (platform) PF 27, and an application server 29. The M2M device 21 corresponds to the mobile communication device 11. The NW node 23 and the relay device 26 correspond to the network operator device 12. The M2M service PF 27 corresponds to the service platform 13. The NW node 23 and the relay device 26 form a network. The network formed of the NW node 23 and the relay device 26 may be a mobile communication network, a fixed communication network, a network used for a PLC or the like. The mobile communication network may be a network such as the 2G/3G/LTE defined by the 3GPP or may be a PHS network, a Wimax network, a wireless LAN or the like.

The M2M device 21 is, for example, a device that autonomously transmits data between communication devices without the intervention of a user's operation. When the M2M device 21 is an automobile, for example, the M2M device 21 detects a state in which the engine is turned on or off and autonomously sends a notification of the state of the engine as the event notification. The M2M device 21 notifies the application server 29 of the event notification.

The application server 29 is a device managed by the application service provider. The application service provider is, for example, a company that provides application services. Further, the application service provider may be a provider different from the mobile communication provider. That is, the application server may be arranged in a network managed by a management policy different from the mobile communication network managed by the mobile communication provider. The application server 29 receives the event notification transmitted from the M2M device 21 and transmits the received event notification to the M2M service PF 27.

The M2M service PF 27 is, for example, a group of devices managed by an M2M service provider. Accordingly, the M2M service PF 27 may be formed of a plurality of server devices or may be formed of one server device. The M2M service is, for example, a communication service that uses the M2M device 21. The M2M service includes, for example, analyzing sensor information or the like collected from the M2M device 21 and notifying the user of the results of analysis. The M2M service PF 27 detects the characteristic change in the M2M device 21 based on the event notification transmitted from the application server 29. The characteristic change corresponds to the network assist information stated above. In another example, the M2M service PF 27 may predict the characteristic change in the M2M device 21 based on the event notification transmitted from the application server 29. Besides the M2M service PF 27 receiving the event notification from the M2M device 21 or the application server 29, the M2M service PF 27 may analyze the content of user data periodically transmitted between the M2M device 21 and the application server 29 to detect the characteristic change.

The M2M service PF 27 communicates data exchanged between the M2M device 21 and the application server 29 via an interface between the NW node 23 and the M2M service PF 27. Further, the M2M service PF 27 communicates a control message or control data via an interface between the relay device 26 and the M2M service PF 27.

Further, the M2M service provider may be a provider different from the mobile communication provider and the application service provider. That is, the application server may be arranged in a network managed by a management policy different from the network managed by the mobile communication provider and the application service provider. In another example, the M2M service PF 27 may be arranged in a network managed by a management policy different from the network managed by the application service provider and the mobile communication provider. Alternatively, the M2M service provider and the application service provider may be the same provider and the M2M service PF 27 and the application server 29 may be arranged in a network managed by the same management policy. Alternatively, the M2M service provider and the mobile communication provider may be the same provider and the M2M service PF 27 and the relay device 26 may be arranged in a network managed by the same management policy. Alternatively, the M2M service provider, the mobile communication provider, and the application service provider may be the same provider and the M2M service PF 27, the application server 29, and the relay device 26 may be arranged in a network managed by the same management policy.

The NW node 23 relays user data or U-Plane data exchanged between the M2M device 21 and the M2M service PF 27. The NW node 23 is arranged in the mobile communication network managed by the mobile communication provider. Further, the NW node 23 includes a plurality of node devices that execute NW processing. Each node device includes NW parameters to execute NW processing.

The NW node 23 manages the NW parameters that are necessary for the M2M device 21 to perform data communication via the NW node 23. The NW node 23 manages, for example, a Paging Area, which defines an area where the M2M device 21 is called when incoming call processing for the M2M device 21 is performed. Further, the NW node 23 manages a Tracking Area, which defines an area where the M2M device 21 performs location registration. Further, the NW node 23 manages a Tracking Area Update Timer, which is a period to register or update the area where the M2M device 21 is called (location registration period). Further, the NW node 23 manages an Inactivity Timer, an idle (dormant) Timer, or a Connection keep time, which defines a timing for changing the state of the M2M device 21 from a state in which it is connected to the NW node 23 (Connect Mode) to a state in which it is disconnected from the NW node 23 (Idle Mode). Further, the NW node 23 manages radio reception intervals or a DRX (discontinuous reception) timer, which defines a timing at which the M2M device 21 receives data.

Further, the NW node 23 manages a Backoff Timer used to suppress congestion in the mobile communication network.

The adjustment of the Inactivity Timer is disclosed, for example, in 3GPP TR 23.887 V0.6.0 (2012-12) 3rd Generation Partnership Project; Technical Specification Group Services and System Aspects; Machine-Type and other Mobile Data Applications Communications Enhancements (Release 12).

The NW node 23 sets the network parameters changed based on the instruction from the relay device 26. The NW node 23 may forward an instruction to change the network parameters transmitted from the relay device 26 to another NW node 23. In this way, besides the case in which the NW node 23 directly receives the instruction to change the network parameters from the relay device 26, the NW node 23 may receive the instruction to change the network parameters via the other NW node 23.

The relay device 26 relays the control message exchanged between the M2M service PF 27 and the NW node 23. The relay device 26 is arranged in the mobile communication network managed by the mobile communication provider. Alternatively, the relay device 26 may be arranged in a network in which the M2M service PF 27 is arranged. The relay device 26 may receive information on the characteristic change in the M2M device 21 from the M2M service PF 27 and notify the NW node 23 of the network parameters to be changed.

Further, the information transmitted to the relay device 26 from the M2M service PF 27 may include not only the network assist information but also an instruction to change or execute the processing on the network. The processing on the network may include, for example, changing the state of the terminal which is in the Connected state to the Idle mode. The processing on the network may also include, for example, detaching the M2M device 21 or changing the destination to which the M2M device 21 is connected from the base station to another base station.

When the network assist information transmitted from the M2M service PF 27 is not necessary, the relay device 26 may discard the received network assist information. In another example, when the network assist information transmitted from the M2M service PF 27 is not necessary, the relay device 26 may notify the M2M service PF 27 of necessary network assist information to acquire the necessary network assist information. In another example, the relay device 26 may send an instruction to change the network parameters using a part of the network assist information transmitted from the M2M service PF 27. In another example, the relay device 26 may analyze or observe the network assist information transmitted from the M2M service PF 27 to generate necessary information.

With reference to FIG. 3, examples of the specific M2M service and characteristic changes in this service according to the second exemplary embodiment of the present invention will be described. In an Intelligent Transport System (ITS), for example, upon receiving a notification of an event indicating that the engine of the automobile is turned on and the automobile is running, the M2M service PF 27 determines that the automobile is moving and detects the moving characteristic change indicating that the automobile is in the moving state. Further, upon receiving a notification of an event indicating that the engine of the automobile is turned off and the automobile is stopped, the M2M service PF 27 determines that the automobile is not moving and detects the moving characteristic change indicating that the automobile is in the stopped state. Further, upon receiving a notification of an event indicating that a navigation system of the automobile is started and the navigation system is being used, the M2M service PF 27 detects the communication characteristic change indicating that the communication intervals are short. Further, upon receiving a notification of an event indicating that the navigation system of the automobile is stopped and the navigation system is not used, the M2M service PF 27 detects the communication characteristic change indicating that the communication intervals are long.

In a traceability that tracks distribution channels of items, upon receiving a notification of an event indicating that the engine of the automobile is turned on and the automobile is making a delivery, the M2M service PF 27 determines that the automobile is in the moving state and detects the moving characteristic change indicating that the automobile is moving. Further, upon receiving a notification of an event indicating that the engine of the automobile is turned off and stopped at a depot, the M2M service PF 27 determines that the automobile is in the stopped state and detects the moving characteristic change indicating that the automobile is not moving. Further, upon receiving a notification of an event indicating that the automobile is making a delivery, the M2M service PF 27 detects the communication characteristic change that the communication intervals are short. Further, upon receiving a notification of an event indicating that the automobile is stopped at a depot, the M2M service PF 27 detects the communication characteristic change that the communication intervals are long.

Upon receiving a notification of an event indicating that a terminal, a device or the like regarding a health care or a security is not located at home, the M2M service PF 27 detects the moving characteristic change indicating that the terminal, the device or the like is in the moving state. Further, upon receiving a notification of an event indicating that the terminal, the device or the like regarding the health care or the security is located at home, the M2M service PF 27 detects the moving characteristic change indicating that the terminal, the device or the like is not moving. The M2M device 21 may transmit GPS data to the M2M service PF 27 or the application server 29 as the location information.

Upon receiving a notification of an event indicating that a power value monitored using a smart meter is an abnormal value, the M2M service PF 27 detects the communication characteristic change indicating that the communication intervals of the smart meter are short since the power value is frequently sent. Further, upon receiving a notification of an event indicating that a power value monitored using a smart meter is a normal value, the M2M service PF 27 detects the communication characteristic change indicating that the communication intervals of the smart meter are long since the power value is sent at predetermined time intervals. A change in the communication characteristics of a temperature value or the like measured by a monitoring device or the like used in the field of agriculture may be detected in a similar way as in the smart meter.

When a communication device is attached to a pet which is to be monitored, upon receiving a notification of an event indicating that the pet is not at home, the M2M service PF 27 detects the moving characteristic change indicating that the pet is in the moving state. Further, upon receiving a notification of an event indicating that the pet is at home, the M2M service PF 27 detects the moving characteristic change indicating that the pet is not moving. Further, when a communication device including a sensor function that detects the heart rate, the body temperature or the like is attached to the pet whose health condition is to be monitored, upon receiving a notification of an event indicating that a value sent from the sensor is an abnormal value, the M2M service PF 27 detects the communication characteristic change indicating that the communication intervals are short since the state of the pet needs to be frequently monitored. Further, upon receiving a notification of an event indicating that the value sent from the sensor is a normal value, the M2M service PF 27 detects the communication characteristic change indicating that the communication intervals are long since it is sufficient to monitor the state of the pet at predetermined time intervals.

Now, examples of the state change in the M2M device 21 other than the moving characteristics and the communication characteristics shown in FIG. 3 will be described. The M2M service PF 27 acquires, for example, information regarding the change in the battery capacity from the M2M device 21 via the application server 29. The M2M service PF 27 may periodically acquire the state regarding the battery capacity of the M2M device 21 from the M2M device 21. The information regarding the battery capacity includes an amount of battery consumption, a remaining amount of battery, a charging state and the like. By periodically acquiring information regarding the battery state, the M2M service PF 27 is able to estimate the transition of the remaining amount of battery or the amount of power consumed in a predetermined period. Therefore, the M2M service PF 27 may detect whether the amount of power consumption is large or small from the amount of power consumption estimated in the predetermined period. Further, the M2M service PF 27 may estimate the time until when the battery capacity is depleted using the amount of power consumption estimated in the predetermined period. The amount of power consumption may be determined to be large when the amount of power consumption exceeds a predetermined threshold and the amount of power consumption may be determined to be small when the amount of power consumption is below the predetermined threshold.

Further, examples of the state change in the M2M device 21 will be described. For example, the M2M service PF 27 may acquire application information installed in the M2M device 21 from the M2M device 21. The application information includes an application that is currently running, end time of the application that is currently running, a predicted start time of an application and the like. The M2M service PF 27 may detect information regarding the communication band that is necessary in the application that is currently running, information regarding intervals at which the application is started or the like.

Figure 4:
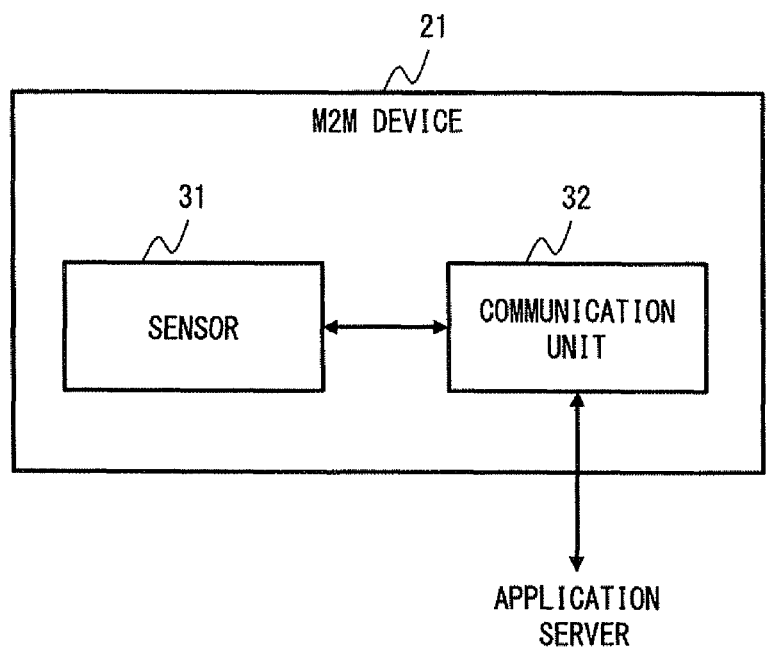
FIG. 4 is a configuration diagram of an M2M device according to the second exemplary embodiment.

Next, with reference to FIG. 4, a configuration example of the M2M device 21 according to the second exemplary embodiment of the present invention will be described. The M2M device 21 includes a sensor 31 and a communication unit 32. The functions of the sensor 31 when, for example, the M2M device 21 is a car such as a general vehicle, a truck, a taxi or the like will be described. In this case, the sensor 31 detects ON/OFF information on the engine and ON/OFF information on the navigation system. The sensor 31 may further collect GPS data. The sensor 31 outputs the information that is detected or collected to the communication unit 32.

The communication unit 32 transmits the information output from the sensor 31 to the application server 29 as the event notification. The communication unit 32 may transmit the event notification to the application server 29 via a radio link provided by the mobile communication provider or may transmit the event notification to the application server 29 via a wireless LAN (Local Area Network) and the Internet.

Figure 5:
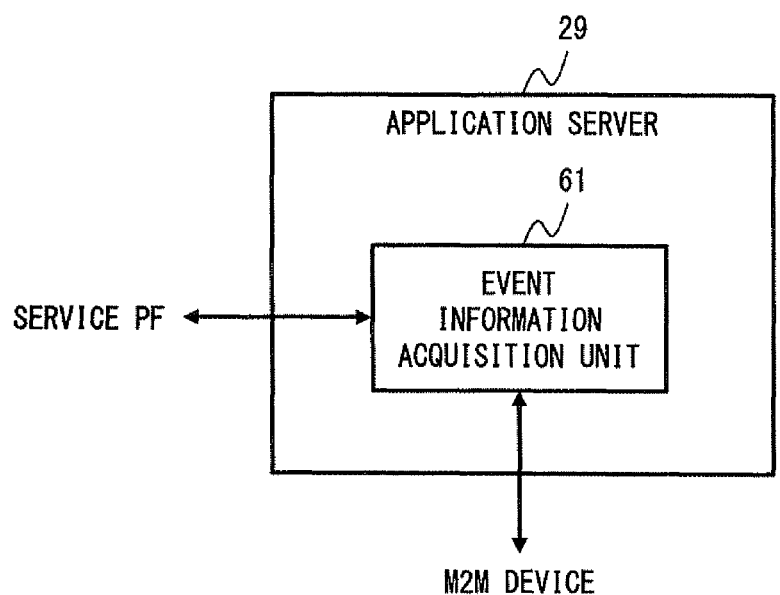
FIG. 5 is a configuration diagram of an application server according to the second exemplary embodiment.

Next, with reference to FIG. 5, a configuration example of the application server 29 according to the second exemplary embodiment of the present invention will be described. The application server 29 includes an event information acquisition unit 61. The event information acquisition unit 61 receives the event notification from the M2M device 21. Further, the event information acquisition unit 61 transmits the received event notification to the M2M service PF 27.

The application server 29 may be managed by a traffic center, a trucking company, a taxi company or the like to transmit or receive the event notification related to automobiles. Otherwise, the application server 29 may be a server that manages agricultural information or electrical information, a server that manages pets or the like to transmit or receive the event notification related to the sensor information.

Figure 6:
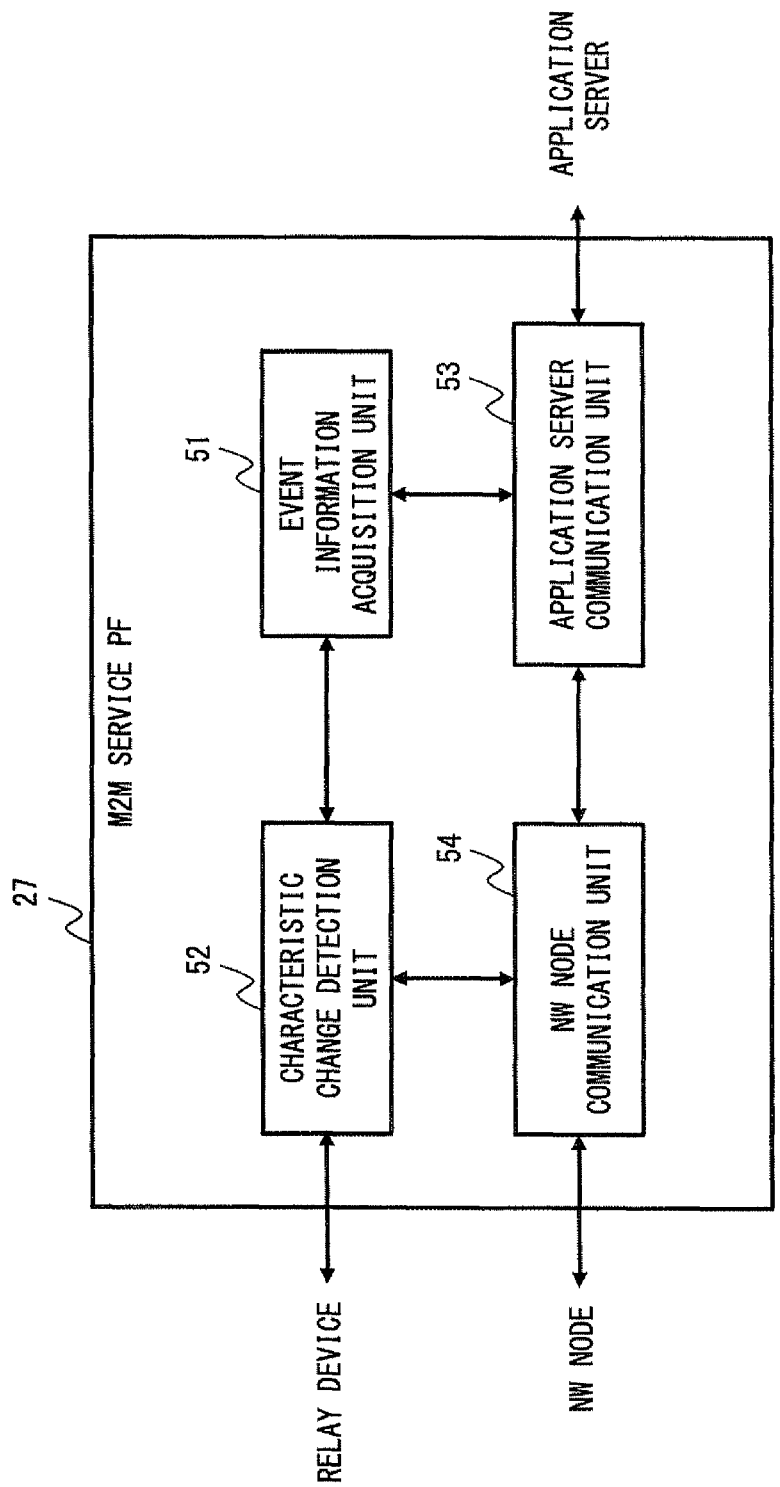
FIG. 6 is a configuration diagram of an M2M service PF according to the second exemplary embodiment.

Next, with reference to FIG. 6, a configuration example of the M2M service PF 27 according to the second exemplary embodiment of the present invention will be described. The M2M service PF 27 includes an event information acquisition unit 51, a characteristic change detection unit 52, an application server communication unit 53, and an NW node communication unit 54. The application server communication unit 53 communicates with the application server 29. The application server communication unit 53 receives the event notification from the application server 29 and outputs the received event notification to the event information acquisition unit 51. Further, the application server communication unit 53 outputs the user data acquired from the application server 29 to the NW node communication unit 54. The event information acquisition unit 51 outputs the received event information to the characteristic change detection unit 52.

Upon receiving the event notification from the event information acquisition unit 51, the characteristic change detection unit 52 detects the characteristic change according to the event notification. For example, the characteristic change detection unit 52 may detect the characteristic change using a database shown in FIG. 7 in which the content of the event and the content of the characteristic change are associated with each other. In the following description, a configuration example of the database shown in FIG. 7 will be described.

The database shown in FIG. 7 manages the information regarding the content of the event regarding which a notification is sent and the information regarding the content of the characteristic change in association with each other. Further, the content of the characteristic change can be classified into a characteristic type and a characteristic content corresponding to the characteristic type. The content of the event includes, for example, an engine stop, an engine start, a navigation start, a navigation stop and the like. The content of the event of the engine stop is associated with the content of the characteristic change in which the characteristic type is "movement" and the characteristic content is "stop". Upon receiving an event notification from the M2M device 21 indicating that the engine has been stopped, the M2M service PF 27 detects that the movement of the M2M device 21 has been stopped. Upon receiving an event notification from the M2M device 21 indicating that the engine has been started, the M2M service PF 27 detects that the M2M device 21 has started the movement. The state in which the movement has been stopped may be referred to as a Low Mobility state or a No mobility state. Further, the state in which the movement has been started may be referred to as a High Mobility state.

Further, upon receiving the event notification from the M2M device 21 indicating that the navigation has been started, the M2M service PF 27 detects that the communication intervals such as intervals at which the information is distributed to the navigation are five minutes. Upon receiving the event notification from the M2M device 21 indicating that the navigation has been ended, the M2M service PF 27 detects that the communication intervals such as intervals at which the information is distributed to the navigation are one hour. The time regarding the information distribution intervals here is merely one example and may be changed.

The characteristic change detection unit 52 outputs information on the characteristic change that has been detected to the relay device 26. The NW node communication unit 54 communicates with the NW node 23. The NW node communication unit 54 transmits the user data output from the application server communication unit 53 to the NW node 23.

Figure 8:
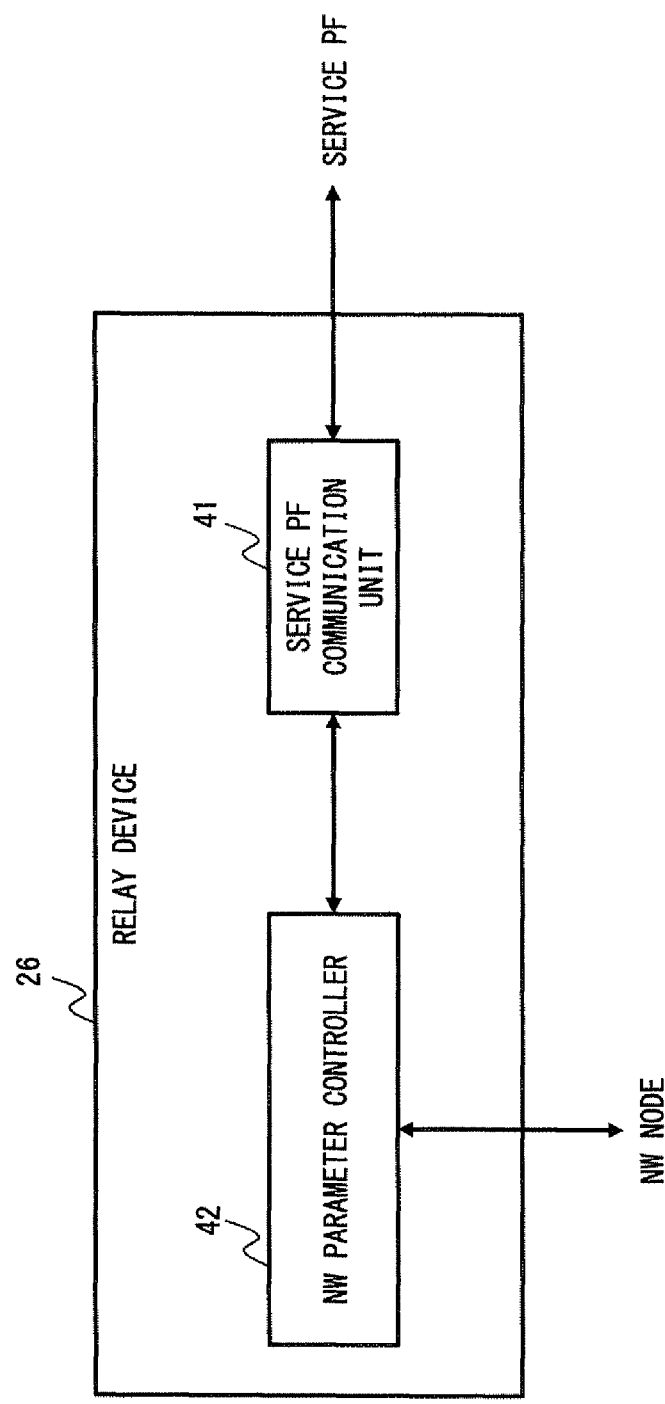
FIG. 8 is a configuration diagram of a relay device according to the second exemplary embodiment.

Next, with reference to FIG. 8, a configuration example of the relay device 26 according to the second exemplary embodiment of the present invention will be described. The relay device 26 includes a service PF communication unit 41 and an NW parameter controller 42. The service PF communication unit 41 receives information on the characteristic change from the M2M service PF 27. The service PF communication unit 41 outputs the information on the characteristic change that has been received to the NW parameter controller 42.

The NW parameter controller 42 instructs the NW node 23 involved in the changes in the NW parameters to change the NW parameters regarding the M2M device 21 based on the characteristic change in the M2M device 21.

The NW parameter controller 42 may specify the NW parameters using a database shown in FIG. 9 in which the content of the characteristic change and the NW parameter are associated with each other. In the following description, a configuration example of the database shown in FIG. 9 will be described.

The database shown in FIG. 9 manages the information on the content of the characteristic change and the information on the NW control policy in association with each other. The information on the content of the characteristic change is similar to the content of the characteristic change in the database shown in FIG. 7. The information on the NW control policy is classified into the NW parameters and the content of the setting.

Upon receiving a notification of information indicating "movement" as the characteristic type and "movement stop" as the content of the characteristic change from the M2M service PF 27, for example, the NW parameter controller 42 may determine the NW control policy to set the size of the paging area regarding the M2M device 21 to a cell size managed by one base station and determine the location registration intervals (Tracking Area Update Timer) of the M2M device 21 as every three hours. Further, upon receiving a notification of information indicating "movement" as the characteristic type and "movement start" as the content of the characteristic change from the M2M service PF 27, the NW parameter controller 42 may determine the NW control policy to set the size of the paging area regarding the M2M device 21 to the size by prefectures and determine the location registration intervals of the M2M device 21 as every ten minutes.

That is, when the M2M device 21 stops moving, the moving range becomes small, which means it is possible to narrow down the paging area as well. It is therefore possible to set only the cell area formed of one base station to a paging area. Meanwhile, when the M2M device 21 starts moving, the moving range becomes large. Therefore, the paging area needs to be increased in order to definitely call for the M2M device 21. Therefore, for example, all the cell areas formed of the base stations in the same prefecture may be set to a paging area. Further, when the M2M device 21 stops moving, the location registration intervals may be set longer since the M2M device 21 is highly likely to be in one location registration area. On the other hand, when the M2M device 21 starts moving, the location registration intervals may be set shorter since the M2M device 21 is highly likely to be in different location registration areas as time proceeds.

The content of the setting of the NW parameters when a content of the characteristic change different from the content of the characteristic change shown in FIG. 9 is detected will be described. Upon receiving a notification of the information indicating that the amount of power consumption of the M2M device 21 is large from the M2M service PF 27, for example, the NW parameter controller 42 may perform control to increase the intervals at which the M2M device 21 performs radio communication. The information regarding the intervals at which the M2M device 21 performs radio communication may be referred to as a DRX timer and the NW parameter controller 42 may control the DRX timer. The M2M device 21 is able to operate the communication function only at a timing at which the radio communication is performed and to stop the communication function at other timings. In such a case, by increasing the intervals at which the M2M device 21 performs communication, the power consumption can be suppressed, whereby it is possible to increase the time during which the M2M device 21 is used.

Further, the NW parameter controller 42 may control the DRX timer by combining the information regarding the amount of power consumption and the information regarding the moving characteristics. For example, even when the information indicating that the amount of power consumption is large is notified, the NW parameter controller 42 may determine that the M2M device will be charged within a predetermined period of time if the M2M device 21 is moving toward home. In such a case, the NW parameter controller 42 may perform control so as to decrease the intervals at which the M2M device 21 performs communication.

Further, upon receiving a notification of information from the M2M service PF 27 indicating that the application activated in the M2M device 21 requires a wide communication band or a high-speed communication, for example, the NW parameter controller 42 may allocate to the M2M device 21 more communication resources than usual. The communication resources include, for example, a communication band, a communication channel or the like. Further, the NW parameter controller 42 may control the allocation of the communication resources based on the information regarding the application which will be started in the M2M device 21.

Further, upon receiving a notification of a bandwidth required in the M2M device 21 from the M2M service PF 27, the NW parameter controller 42 may determine the bearer that is to be used by the M2M device 21. The bearer may be, for example, a radio bearer used in the 2G/3G network of the 3GPP, a radio bearer used in the LTE of the 3GPP, a radio bearer used in the wireless LAN, a radio bearer used in the PHS, or a radio bearer used in the Wimax. Further, the NW parameter controller 42 may cause the M2M device 21 to connect to a fixed communication network or a network used in a power-line carrier communication (PLC). Further, upon receiving a notification of a bandwidth required in the M2M device 21 from the M2M service PF 27, the NW parameter controller 42 may change the transmission power for the M2M device 21 in the base station that accommodates the M2M device 21.

Next, with reference to FIG. 10, a flow of processing for changing the NW parameters according to the second exemplary embodiment of the present invention will be described. First, the M2M device 21 transmits the event notification message to the application server (AS) 29 (S11). The event notification message may be referred to as mobility information. For example, the M2M device 21 sets information indicating that the engine is turned on or off as the event notification message to send this information to the application server 29.

Next, the application server 29 transmits the event notification message transmitted from the M2M device 21 to the M2M service PF 27 (S12). Next, the M2M service PF 27 transmits the characteristic change notification message to the relay device 26 to send a notification of the characteristic change detected based on the event notification that has been transmitted (S13). The characteristic change notification message may be referred to as a mobility state. For example, when the information indicating that the engine is turned on is set in the event notification message, the M2M service PF 27 sets "moving", High Mobility, or the normal state as the moving characteristics and transmits the characteristic change message. In another case, when the information indicating that the engine is turned off is set in the event notification message, the M2M service PF 27 sets Low Mobility or No Mobility as the moving characteristics and transmits the characteristic change message.

Figure 11:
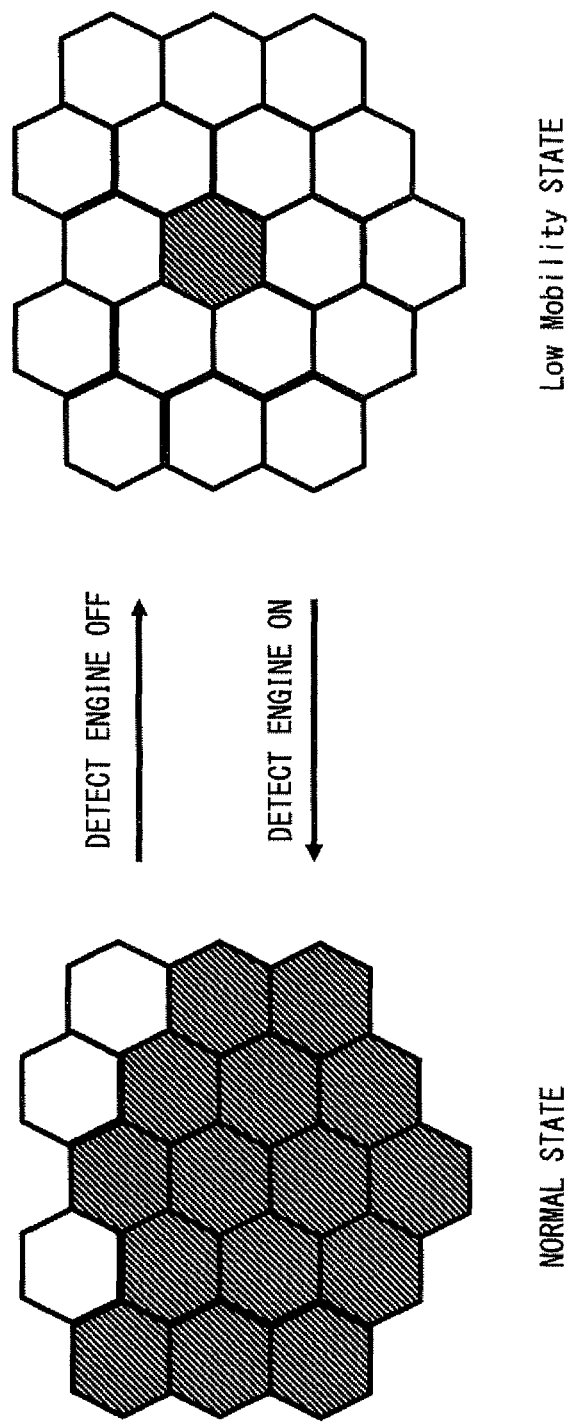
FIG. 11 is a diagram for describing a change in a Paging Area according to the second exemplary embodiment.

Next, the relay device 26 transmits the NW parameter change notification message to the NW node 23 that involves the change in the NW parameters based on the characteristic change message transmitted from the M2M service PF 27 (S14). The NW parameters to be changed will be described with reference to FIG. 11. In FIG. 11, the NW parameters will be described using the Paging Area. Upon receiving a notification indicating that the M2M device 21 is in the Low Mobility state or the No Mobility state from the M2M service PF 27, the relay device 26 notifies the NW node 23 that the Paging Area is set to the cell to which the M2M device 21 has last connected (shaded part in the Low Mobility state in FIG. 11). Further, upon receiving a notification indicating that the M2M device 21 is in the normal state or the High Mobility state from the M2M service PF 27, the relay device 26 notifies the NW node 23 that the Paging Area is set to the cells registered in a Tracking Area List (shaded part in the normal state in FIG. 11). The Tracking Area List is a list including a plurality of cells that are determined in advance as cells that calls for the M2M device 21. As will be shown from FIG. 11, the Paging Area in the normal state and the like is wider than that in the Low Mobility state and the like.

As described above, with the use of the mobile communication system according to the second exemplary embodiment of the present invention, similar to the first exemplary embodiment, it is possible to set appropriate NW parameters applied to the NW node 23 based on the information regarding the characteristic change in the M2M device 21 regarding which a notification has been sent from the M2M service PF 27 also in the system to provide the M2M service.

Third Exemplary Embodiment

Next, with reference to FIG. 12, a flow of processing for changing NW parameters when the M2M device 21 periodically transmits information acquired from a sensor to the application server 29 will be described.

Figure 12:
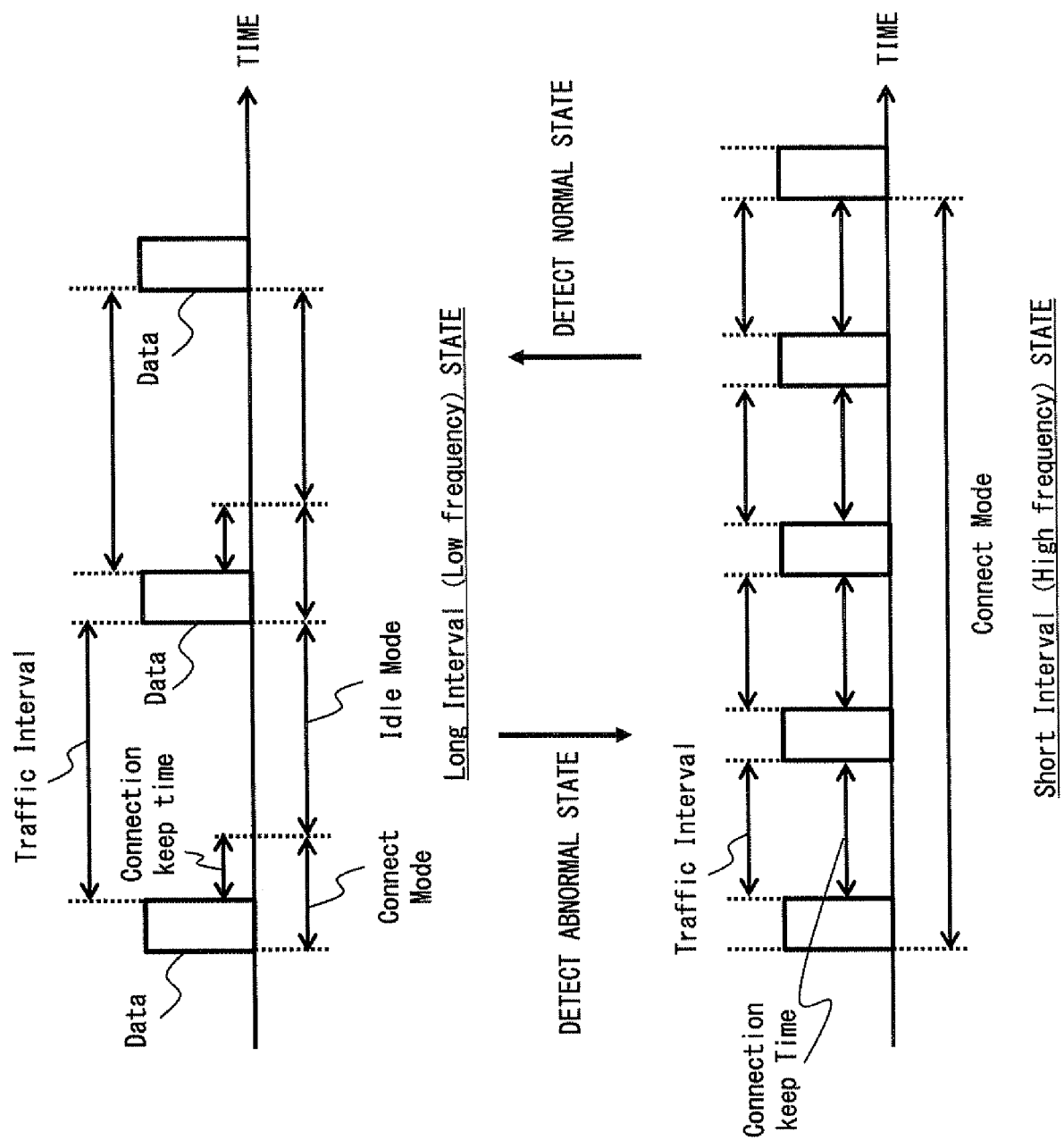
FIG. 12 is a diagram for describing an operation in which an M2M device periodically transmits information acquired from a sensor to an application server according to a third exemplary embodiment.

FIG. 12 shows intervals at which the M2M device 21 transmits data. The Traffic Interval indicating the intervals at which the data is transmitted in the Low frequency state or the Long Interval state is longer than the Traffic Interval in the High frequency state or the Short Interval state. Further, in the Long Interval state, after the data transmission is started, the M2M device 21 is connected to the NW node 23 for a predetermined period of time. This period is called a Connect Mode. Further, a state in which the M2M device 21 is not connected to the NW node 23 is called an Idle Mode. Further, a period from the time at which the data transmission is completed until the time at which the M2M device 21 switches from the Connect Mode to the Idle Mode is referred to as an Inactivity Timer or a Connection keep time. Hereinafter, a flow of processing for changing the NW parameters will be described with reference to FIG. 10. Before describing FIG. 10, FIG. 12 will be described as appropriate.

First, the M2M device 21 transmits to the application server 29 the event notification message in which it is set whether the information acquired using the sensor is in the normal state or the abnormal state (S11). The M2M device 21 may include a sensor related to the agriculture (e.g., a temperature sensor), a smart grid, or a sensor to monitor pets, for example. The abnormal state is a state in which the value of radioactivity, temperature, vibration or the like acquired using the sensor exceeds a reference value, for example. The normal state is a state in which the value of radioactivity, temperature, vibration or the like acquired using the sensor does not exceed the reference value, for example.

Next, the application server 29 transmits the event notification message to the M2M service PF 27 (S12). Next, when the normal state is set in the event notification message, the M2M service PF 27 sets the Long Interval state as the communication characteristics and transmits the characteristic change notification message to the relay device 26 (S13). Further, when the abnormal state is set in the event notification message, the M2M service PF 27 sets the Short Interval state as the communication characteristics and transmits the characteristic change notification message to the relay device 26 (S13).

Next, when the Long Interval state is set in the characteristic change notification message, the relay device 26 notifies the NW node 23 that the Short connect mode is set for the Connection keep time in order to decrease the period of the state in which the M2M device 21 is connected to the NW node 23 (S14). When the Short Interval state is set in the characteristic change notification message, the relay device 26 notifies the NW node 23 that the Long connect mode is set for the Connection keep time in order to increase the period of the state in which the M2M device 21 is connected to the NW node 23 (S14). The Connection keep time for which the Long connect mode is set is longer than the Connection keep time for which the Short connected mode is set.

As described above, the Connection keep time is changed according to whether the information acquired using the sensor of the M2M device 21 indicates the normal state or the abnormal state, whereby it is possible to increase the time during which the Idle Mode is set to reduce the power consumption in the M2M device 21 in the Long Interval state. Since the Traffic Interval is short in the Short Interval state, the M2M device 21 is able to reduce the number of times of switching between the Connect Mode and the Idle Mode, whereby it is possible to simplify the control operation by decreasing the time during which the Idle Mode is set.

Fourth Exemplary Embodiment

Next, with reference to FIG. 13, a flow of processing for setting NW parameters according to a fourth exemplary embodiment of the present invention will be described. First, the M2M device 21 transmits the event notification message to the application server 29 (S21). Since Steps S22 and S23 are similar to Steps S13 and S14 in FIG. 10, the detailed description thereof will be omitted.

Figure 10:
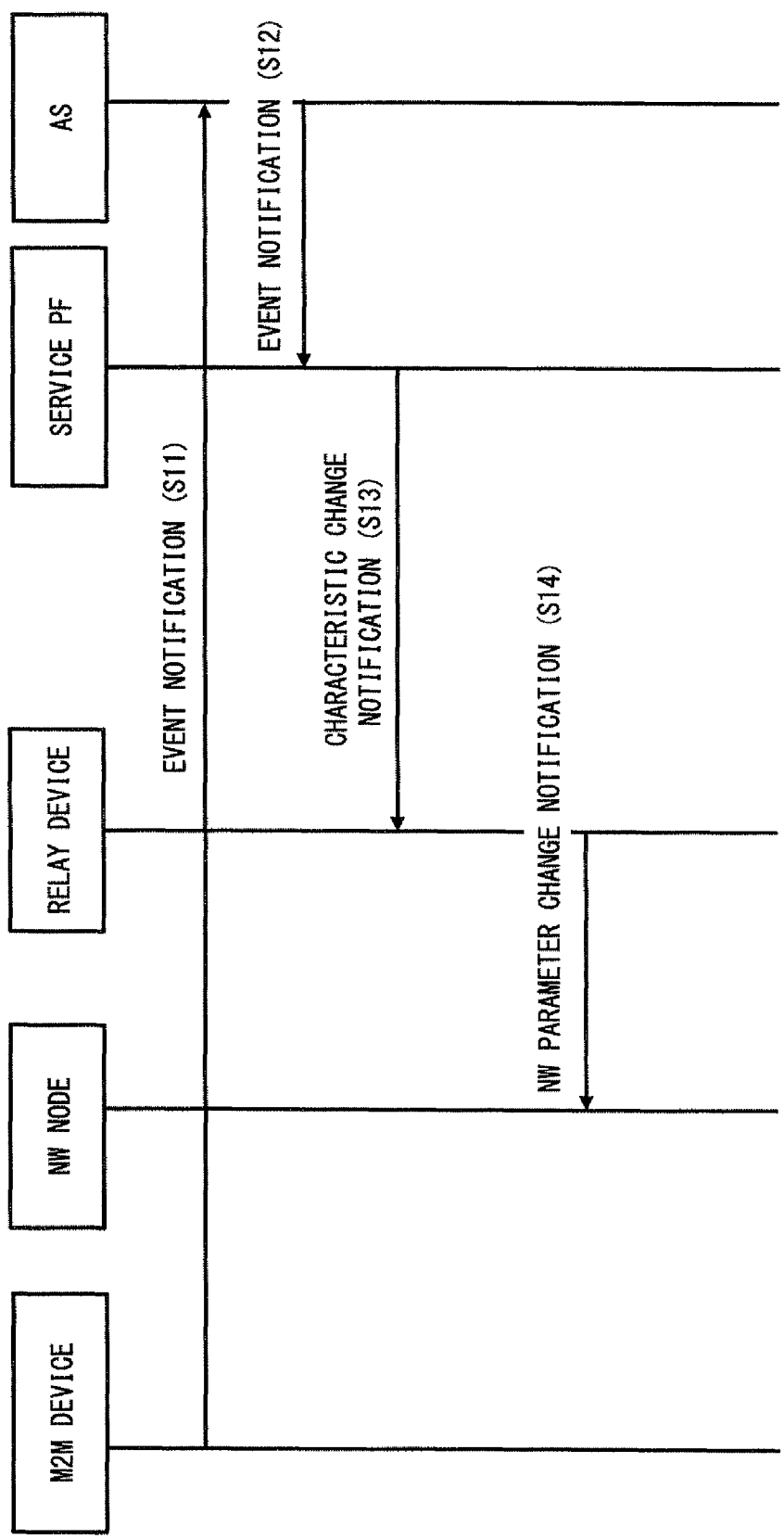
FIG. 10 is a sequence showing a flow of processing for changing the NW parameters according to the second exemplary embodiment.
Figure 13:
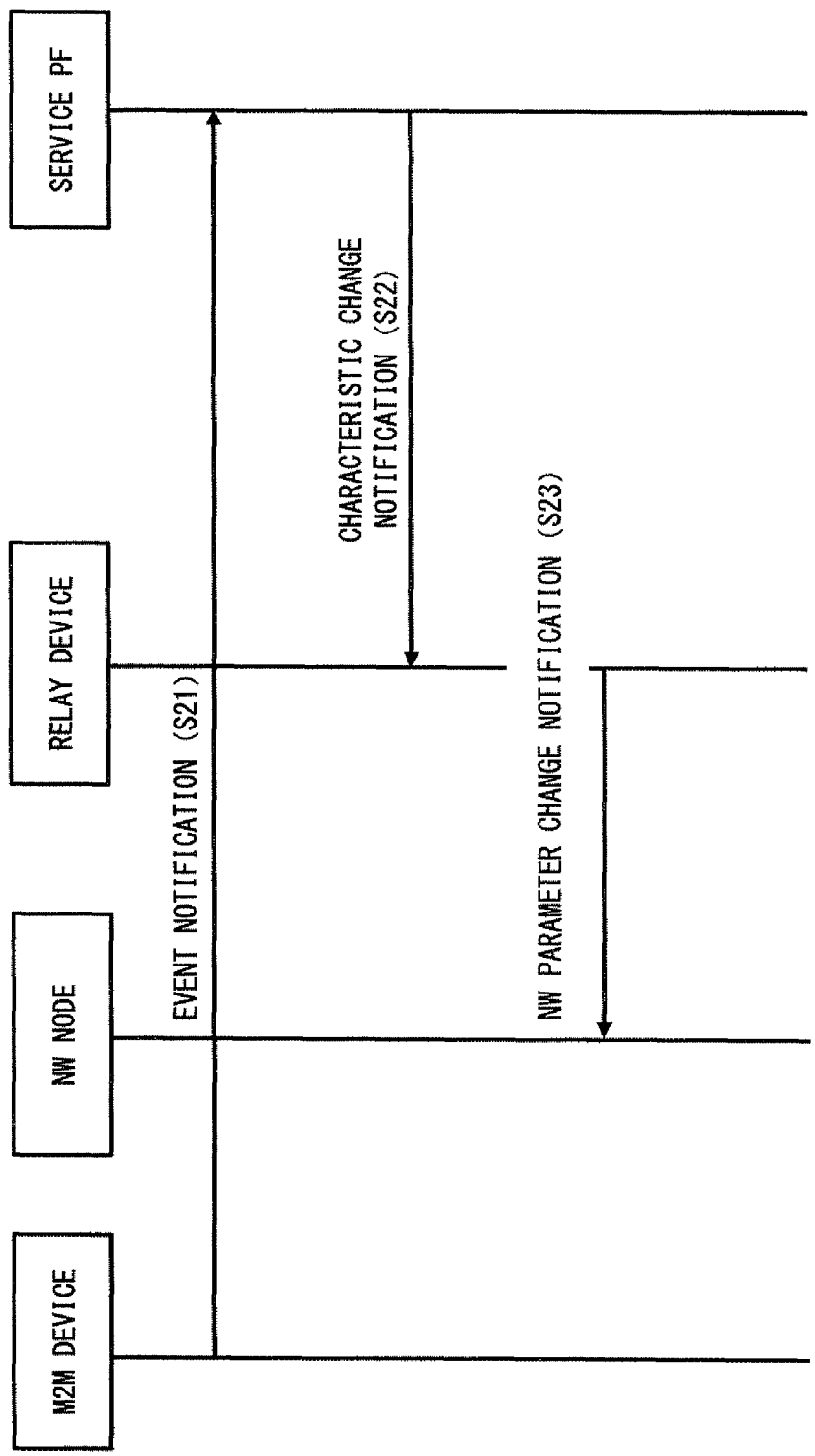
FIG. 13 is a sequence showing a flow of processing for changing NW parameters according to a fourth exemplary embodiment.

FIG. 13 is different from FIG. 10 in that, while the M2M service PF 27 acquires the event notification message via the application server 29 in FIG. 10, the M2M service PF 27 directly acquires the event notification message from the M2M device 21 in FIG. 13.

The M2M service PF 27 acquires the event notification message from the M2M device 21 using an interface or an API set between the M2M device 21 and the M2M service PF 27.

Further, the M2M service PF 27 may analyze the content of the user data that the M2M device 21 periodically transmits to the application server 29 to generate the network assist information. It is assumed, for example, that the M2M device 21 periodically transmits the temperature information to the application server 29 and the M2M device 21 operates to increase the frequency of transmitting the temperature information when the temperature exceeds a predetermined temperature. In such a case, the M2M service PF 27 analyzes the temperature information transmitted to the application server 29 from the M2M device 21. When the temperature is prone to increase, the M2M service PF 27 generates the network assist information indicating that the temperature is increasing. Upon receiving the network assist information indicating that the temperature is increasing, the relay device 26 may send an instruction to change the network parameters to allocate more communication resources to the M2M device 21. That is, the M2M service PF 27 may generate the network assist information using information that is intentionally sent as a notification such as a state change in the M2M device 21 sent to the application server 29 from the M2M device 21 or may generate the network assist information using information or the like that is not intended as a notification such as a state change by the M2M device 21.

Figure 14:
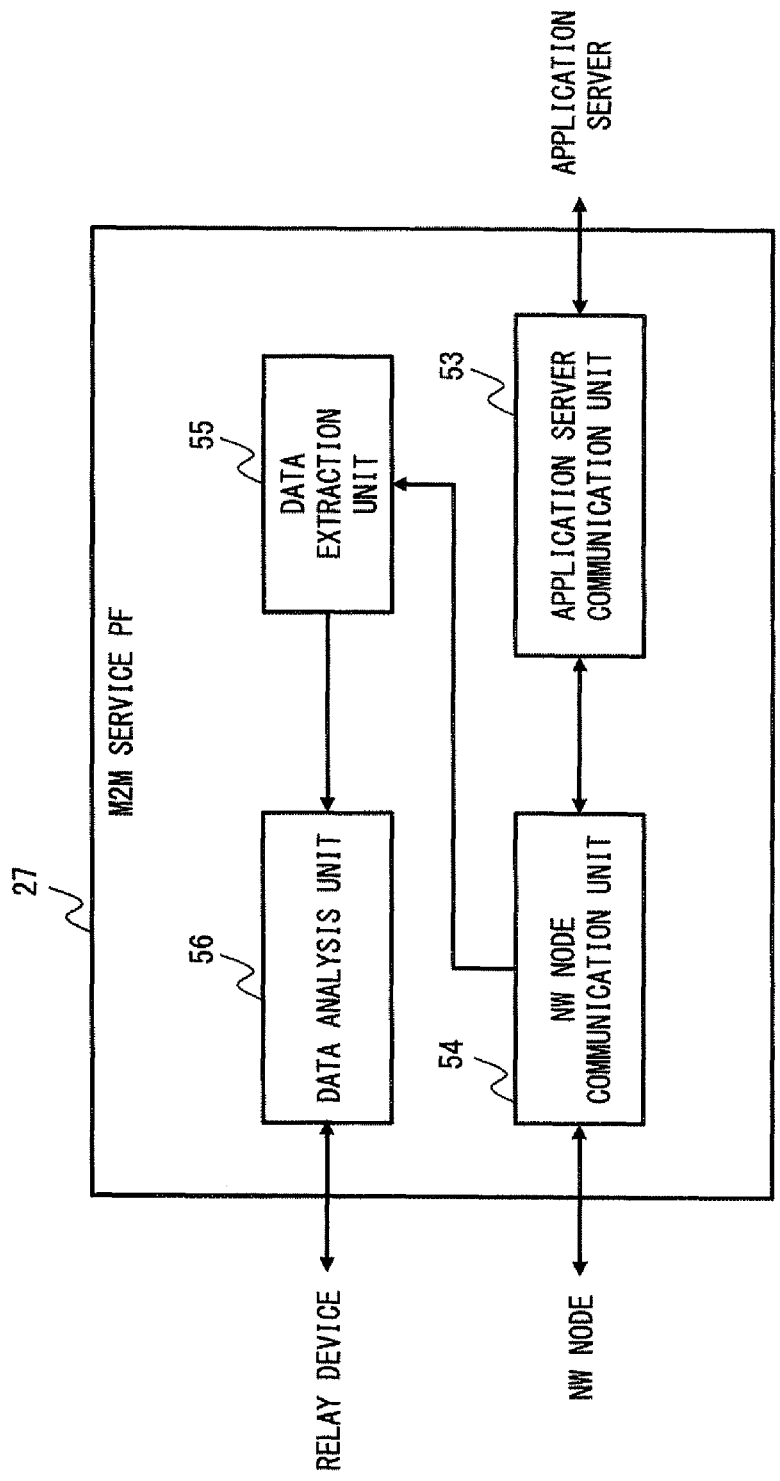
FIG. 14 is a configuration diagram of an M2M service platform according to the fourth exemplary embodiment.

With reference to FIG. 14, a configuration example of the M2M service PF 27 in such a case will be described. The M2M service PF 27 shown in FIG. 14 includes an application server communication unit 53, an NW node communication unit 54, a data extraction unit 55, and a data analysis unit 56.

The NW node communication unit 54 receives information that is periodically transmitted to the application server 29 from the M2M device 21, and outputs the received information to the application server communication unit 53. The NW node communication unit 54 outputs the received information also to the data extraction unit 55.

The application server communication unit 53 transmits the information output from the NW node communication unit 54 to the application server 29.

The data extraction unit 55 extracts data to be analyzed from the data output from the NW node communication unit 54. When, for example, temperature information measured by the M2M device 21 is included in the data transmitted from the M2M device 21, the data extraction unit 55 extracts the temperature information. The data extraction unit 55 outputs the extracted data to the data analysis unit 56.

The data analysis unit 56 analyzes the data output from the data extraction unit 55. When the temperature information is output from the data extraction unit 55, for example, the data analysis unit 56 may analyze trends in temperature changes to determine whether the temperature is prone to increase or decrease, for example.

The data analysis unit 56 generates the network assist information according to the results of analyzing the data and outputs the network assist information that is generated to the relay device 26.

As described above, with the use of the mobile communication system according to the fourth exemplary embodiment of the present invention, the M2M device 21 is able to directly transmit the event notification message to the M2M service PF 27. It is therefore possible to omit a part of the process step in the mobile communication system, whereby it is possible to simplify the processing in the mobile communication system.

Fifth Exemplary Embodiment

Next, another example of the NW assist information regarding which a notification is sent to the relay device 26 from the M2M service PF 27 will be described. The M2M service PF 27 regularly collects, for example, information on changes in the amount of data communication in the M2M device 21, changes in the communication intervals or the like. In this case, the M2M service PF 27 may calculate, for example, the average value, the maximum value, the minimum value or the like of the amount of data communication in a predetermined period. Further, the M2M service PF 27 may calculate a variance of the amount of data communication and also calculate the expected value or the like of the amount of data communication based on the calculated variance. The M2M service PF 27 may notify the relay device 26 of the statistical information thus calculated as the network assist information.

The relay device 26 may change, for example, the communication resources to be allocated to the M2M device 21 using the network assist information on the amount of data communication of the M2M device 21 regarding which a notification has been sent from the M2M service PF 27. Besides the statistical information regarding the amount of data communication, the M2M service PF 27 may calculate statistical information regarding moving characteristics, battery information, application information, a radio wave state or the like.

Sixth Exemplary Embodiment

Next, another example of the network assist information regarding which a notification is sent to the relay device 26 from the M2M service PF 27 different from the one described in the fifth exemplary embodiment will be described. The M2M service PF 27 may manage the plurality of M2M devices 21 by groups and detect a change in communication characteristics or the like in the group as the network assist information. The M2M service PF 27 may set, for example, a group for each company to which the M2M device belongs or may set groups based on the subscriber information of the M2M device.

Further, the M2M service PF 27 may set groups according to the location of the M2M device. The M2M service PF 27 may set, for example, a plurality of M2M devices located in the same cell area in the same group, and may set a group for each municipality or each prefecture, for example. The M2M service PF 27 may set a plurality of M2M devices located on roads in a specific area in the same group.

The M2M service PF 27 may set a group for each time period during which the M2M device performs communication. The M2M service PF 27 may receive, for example, an event notification indicating that the communication is initiated when each of the plurality of M2M devices performs communication. The M2M service PF 27 may estimate the time period during which each M2M device performs communication by receiving the event notification regarding the start of the communication from a plurality of M2M devices for a predetermined period of time and analyzing the event notification. The M2M service PF 27 may set a plurality of M2M devices that perform communication in the same time period to the same group. The same time period may be, for example, a specified time, AM, PM, or a specific day of the week.

Further, the groups may be set based on the location of the M2M device or the time period during which the M2M device performs communication.

As described above, when the M2M devices are classified into groups, the M2M service PF 27 notifies the relay device 26 of a group identifier for identifying the group together with the network assist information. When the group is determined according to the location of the M2M device, an area identifier for identifying the area of the M2M device may also be sent to the relay device 26. When the group is determined according to the time at which the M2M device starts the communication, a time period identifier for identifying the time period may also be sent to the relay device 26.

Seventh Exemplary Embodiment

Figure 15:
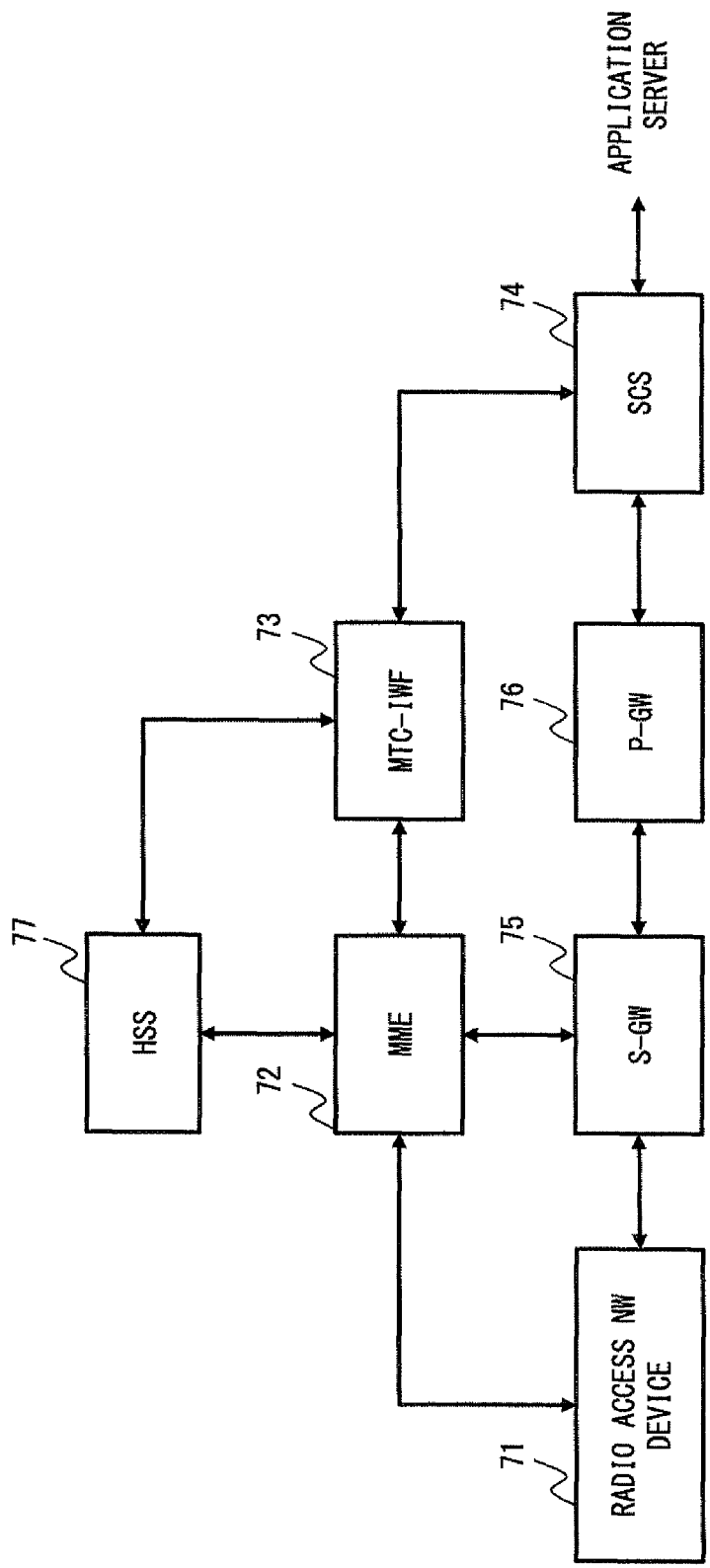
FIG. 15 is a configuration diagram of a network defined by the 3GPP according to a seventh exemplary embodiment.

Next, with reference to FIG. 15, a configuration example of a network according to a seventh exemplary embodiment of the present invention will be described. In FIG. 15, an example in which the mobile communication provider uses a mobile communication network defined by the 3rd Generation Partnership Project (3GPP) will be described. In FIG. 15, a radio access NW device 71, an HSS 77, a Mobility Management Entity (MME) 72, a Serving Gateway (S-GW) 75, and a Packet Data Network Gateway (P-GW) 76 correspond to the NW node 23. Further, the NW node 23 may include a PCRF, which is a node device defined by the 3GPP.

Further, an MTC-IWF 73 corresponds to the relay device 26. An SCS 74 corresponds to the M2M service plat PF.

The radio access NW device 71 may be a base station. Further, the radio access NW device 71 may be an eNB which is a base station when the Long Term Evolution (LTE) is used as a wireless system. The MME 72 mainly performs mobility management of the M2M device 21. The SCS 74 is a communication node provided to communicate with the application server and acquires information on the event notification from the application server. The SCS 74 outputs information on the characteristic change generated based on the event notification to the MTC-IWF 73. A Tsp interface defined in the 3GPP is used as an interface between the MTC-IWF 73 and the SCS 74. A Diameter protocol is used as the Tsp interface.

The S-GW 75 and the P-GW 76 transmit or receive user data such as image data or voice data transmitted from the M2M device 21. The S-GW 75 and the P-GW 76 receive the user data transmitted via the radio access NW device 71 and output it to the SCS 74.

The MTC-IWF 73 changes the NW parameters regarding the M2M device 21 managed by the HSS 77, the MME 72, the S-GW 75, the P-GW 76 and the like based on the information on the transformation of characteristics output from the SCS 74. Further, when the MME 72 and the HSS 77 manage the NW parameters regarding the M2M device 21, the MTC-IWF 73 changes the NW parameters regarding the M2M device 21 managed in the MME 72 and the HSS 77. In another example, in order to change the NW parameters regarding the M2M device 21 managed by the eNB, which is the S-GW 75, the P-GW 76, or the radio access NW device 71 based on the information regarding the transformation of characteristics output from the SCS 74, the MTC-IWF 73 may change the NW parameter of each device via the MME 72. Hereinafter, a case in which the Paging Area (or Tracking Area), the Tracking Area Update Timer, the Inactivity Timer, the Connection keep time, the DRX Timer, the Backoff Timer, the communication policy, the QCI (QoS), the bandwidth guarantee parameters and the like are used as the NW parameters will be described in detail.

The MTC-IWF 73 outputs a change instruction message to the HSS 77 or the MME 72 to change the Paging Area (or the Tracking Area), for example. Further, the MTC-IWF 73 outputs a change instruction message to the HSS 77 to change the Tracking Area Update Timer. When the MME 72 manages the Tracking Area Update Timer, the MTC-IWF 73 may output the change instruction message regarding the Tracking Area Update Timer to the MME 72 as well.

The MTC-IWF 73 outputs the change instruction message to the HSS 77 or the MME 72 to change the Inactivity Timer, the Connection keep time, or the DRX Timer. Further, the MTC-IWF 73 outputs the change instruction message to the eNB in order to change the parameters associated with the Inactivity Timer or the like held by the eNB.

The MTC-IWF 73 outputs the change instruction message to the MME 72 to change the Backoff Timer. The MTC-IWF 73 outputs a change instruction message to the PCRF 78, the S-GW 75, and the P-GW 76 to change the communication policy, the QCI (QoS), the bandwidth guarantee parameters and the like. Further, the MTC-IWF 73 is able to appropriately change the destination to which the change instruction message is output when, for example, a device that manages the NW parameters is changed or newly provided.

As described above, with the use of the mobile communication system according to the fifth exemplary embodiment of the present invention, the NW parameters managed in the HSS 75 or the MME 72 can be changed to appropriate values also in a case in which the network defined by the 3GPP is used based on the information regarding the characteristic change in the M2M device 21 sent from the M2M service PF 27.

While the network shown in FIG. 15 has been described using a configuration example of an Evolved Packet Core (EPC) used in the LTE, the network in the UMTS may be configured using a concept similar to that in the LTE. In the case of the UMTS, for example, the operation of the MME 72 shown in FIG. 15 may be performed by a control plane of a Serving GPRS Support Node (SGSN). The operation of the HSS 77 may be performed by a Home Location Register (HLR). The operation of the S-GW 75 may be performed by a user plane function of the SGSN. The operation of the P-GW 76 may be performed by a Gateway GPRS Support Node (GGSN). Further, the operation of the radio access NW device 71 may be performed by a Radio Network Controller (RNC).

With reference to FIGS. 16 to 23, examples of the network parameters held in the HSS 77, the MME 72, the S-GW 75, the P-GW 76, and the UE will be described.

FIGS. 16 and 17 show lists of the network parameters held by the HSS 77. The left line in FIGS. 16 and 17 shows the list of the network parameters held by the HSS 77 and the right line in FIGS. 16 and 17 shows the network assist information used to change the network parameters so that the network assist information is associated with the network parameters. Further, the parameter in parentheses of each network parameter specifically shows the network parameter defined by the 3GPP. The network parameters defined by the 3GPP are disclosed, for example, in 3GPP TS23.401 V11.4.0 (2012-12). The tables shown in FIGS. 18 to 23 have a configuration similar to that of the tables shown in FIGS. 16 and 17.

When the MTC-IWF 73 receives information on the change in the SIM information as the network assist information, for example, the MTC-IWF 73 causes the HSS 77 to change the subscriber identifier (IMSI). Other network parameters are shown in FIGS. 16 and 17.

FIGS. 18 to 20 show lists of the network parameters held by the MME 72. For example, when the MTC-IWF 73 receives information regarding the security level as the network assist information, the MTC-IWF 73 causes the MME 72 to change a determination regarding whether the control message in the network needs to be encrypted (Selected NAS Algorithm). Other network parameters are shown in FIGS. 18 to 20. Further, the subscriber identifier (IMSI) held by the MME 72 is changed when the corresponding network parameter in the HSS 77 is changed. The network parameter regarding which it is defined in the network assist information that this parameter should also be changed when the parameter of the HSS is changed is changed in a similar way as in the subscriber identifier (IMSI).

Besides UE-AMBR, LIPA Allowed, APN in Use, APN Restriction being changed when the corresponding network parameters in the HSS 77 have been changed, they may be changed also when the MTC-IWF 73 has received the relevant network assist information.

FIG. 21 shows a list of the network parameters held by the S-GW 75. Further, FIGS. 22 and 23 show lists of the network parameters held by the P-GW 76. The network parameters held by the S-GW 75 and the P-GW 76 are changed when the corresponding network parameters in the HSS 77 are changed.

Besides APN in Use, MS Info Change Reporting support indication, and MS Info Change Reporting Action being changed when the corresponding network parameters in the HSS 77 have been changed, they may be changed also when the MTC-IWF 73 has received the relevant network assist information.

FIGS. 24 and 25 show lists of the network parameters held by the UE. For example, when the MTC-IWF 73 receives information regarding the network security level as the network assist information, the MTC-IWF 73 causes the UE to change a temporary allocated identifier (Temporary Identity used in Next Update). Other network parameters are shown in FIGS. 24 and 25. Further, the network parameter regarding which it is defined in the network assist information that this parameter should also be changed when the parameter of the HSS is changed is changed when the corresponding network parameter in the HSS 77 is changed. In a similar way, the network parameter regarding which it is defined in the network assist information that this parameter should also be changed when the parameter of the MME is changed is changed when the corresponding network parameter in the MME 72 is changed.

Eighth Exemplary Embodiment

Next, with reference to FIG. 26, an example in which network assist information generated based on the state change in the mobile communication device 11 detected by the mobile communication device 11 is transmitted to the network operator device 12 without the intervention of the service platform 13 will be described. In the description with reference to FIG. 26, a User Equipment (UE) is used as a specific example of the mobile communication device 11 and an eNB, an MME, an S-GW, a P-GW, a PCRF, an HSS, an MTC-IWF, and an SCS are used as specific examples of the network operator device 12.

Figure 26:
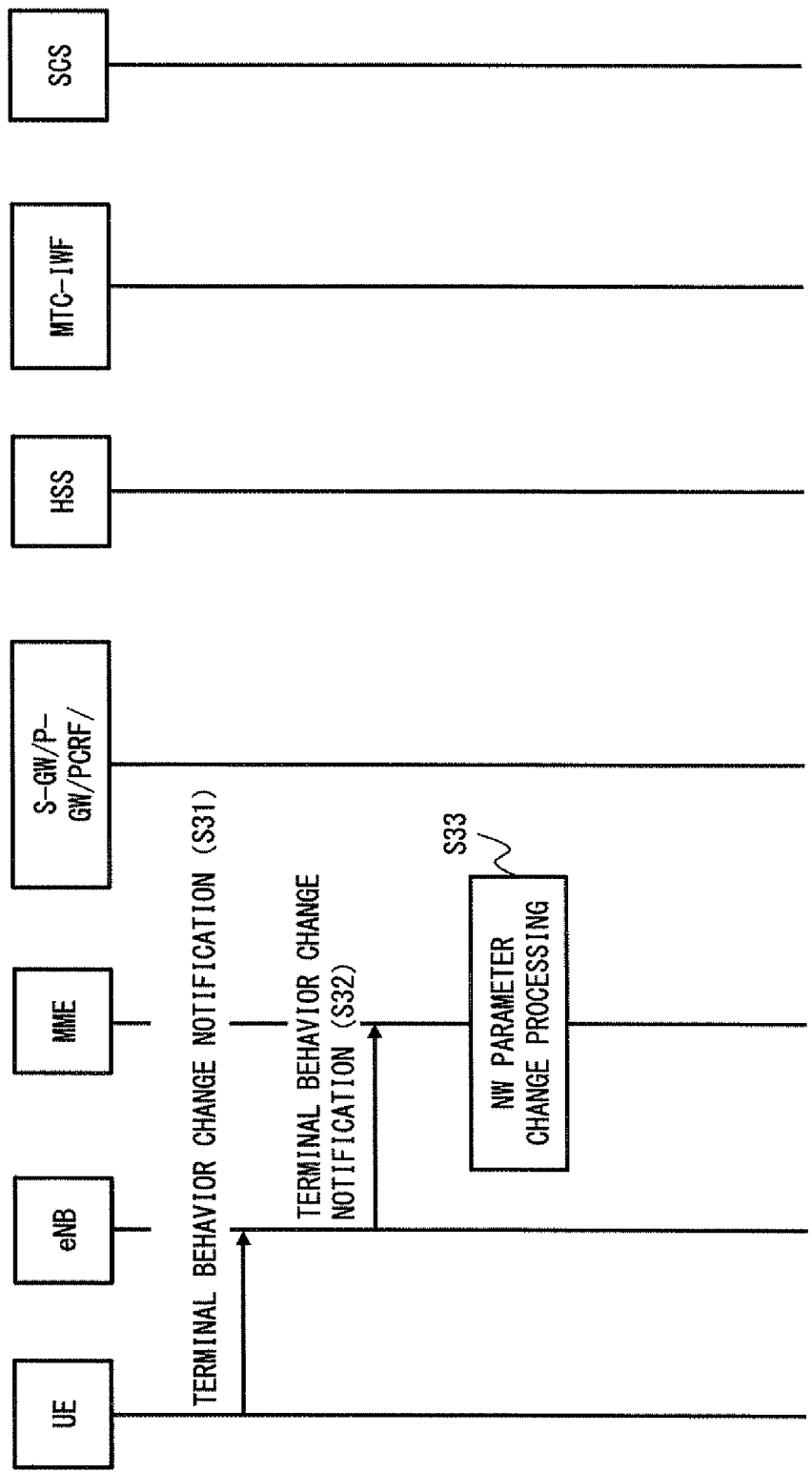
FIG. 26 is a diagram showing a flow of processing for changing a network parameter according to an eighth exemplary embodiment.

In FIG. 26, an example of changing the network parameters in the MME will be described. First, the UE transmits a terminal behavior change notification message to the eNB (S31). The terminal behavior change notification message includes the network assist information and a terminal identifier of the UE. In the first exemplary embodiment, the example in which the mobile communication device 11 transmits the event notification to the service platform 13 has been described. In the first exemplary embodiment, the mobile communication device 11 transmits the event notification to the service platform 13 as the application information. That is, the mobile communication device 11 transmits the event notification to the service platform 13 as the user data. Meanwhile, in Step S31 in FIG. 26, the mobile communication device 11 transmits the terminal behavior change notification message including the network assist information as the control message or the control data different from the user data.

Next, the eNB transmits the terminal behavior change notification message to the MME (S32). The MME changes the NW parameters regarding the UE according to the network assist information on the UE that has been sent (S33). The MME may transmit, when it is determined that the NW parameters need to be changed in another network operator device according to the network assist information of the UE that has been sent, the terminal behavior change notification message to another network operator device.

Further, upon receiving the terminal behavior change notification message in Step S32 and determining that the NW parameters need to be changed according to the characteristic change information, the eNB may change the NW parameters of the eNB.

Further, the UE may transmit the terminal behavior change notification message to the SCS using an OMA-DM protocol. Upon receiving the terminal behavior change notification message, the SCS transmits the terminal behavior change notification message to the MTC-IWF and the MTC-IWF changes the NW parameters.

As described above, the network operator device such as the MME, the eNB or the like may directly acquire the network assist information from the UE without passing through the service platform. It is therefore possible to decrease the number of signals transmitted in the mobile communication network, whereby it is possible to prevent the communication from being complicated.

While the example in which the UE transmits the network assist information to the eNB using the control message has been described in the above example, the UE may transmit information regarding the state change in the UE to the eNB using the control message. In such a case, the eNB, the MME or the like that has received the information on the state change from the UE may determine the network parameters to be changed based on the information regarding the state change in the UE that has been received.

While the present invention has been described as a hardware configuration in the aforementioned exemplary embodiments, the present invention is not limited thereto. The present invention may achieve the processing of the relay device 26 in FIGS. 10 and 13 by causing a Central Processing Unit (CPU) to execute a computer program.

In the above examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present invention is not limited to the aforementioned exemplary embodiments and may be changed as appropriate without departing from the spirit of the present invention.

While the present invention has been described above with reference to the exemplary embodiments, the present invention is not limited to the above exemplary embodiments. Various changes that can be understood by those skilled in the art may be performed on the configurations and the details of the present invention within the scope of the present invention.

This application is based upon and claims the benefit of priority from Japanese Patent Application No. 2013-28458, filed on Feb. 15, 2013, the disclosure of which is incorporated herein in its entirety by reference.

REFERENCE SIGNS LIST

11 MOBILE COMMUNICATION DEVICE
12 NETWORK OPERATOR DEVICE
13 SERVICE PLATFORM
21 M2M DEVICE
23 NW NODE
26 RELAY DEVICE
27 M2M SERVICE PF
29 APPLICATION SERVER
31 SENSOR
32 COMMUNICATION UNIT
41 SERVICE PF COMMUNICATION UNIT
42 NW PARAMETER CONTROLLER
51 EVENT INFORMATION ACQUISITION UNIT
52 CHARACTERISTIC CHANGE DETECTION UNIT
53 APPLICATION SERVER COMMUNICATION UNIT
54 NW NODE COMMUNICATION UNIT
55 DATA EXTRACTION UNIT
56 DATA ANALYSIS UNIT
61 EVENT INFORMATION ACQUISITION UNIT
71 RADIO ACCESS NW DEVICE
72 MME
73 MTC-IWF
74 SCS
75 S-GW
76 P-GW
77 HSS
78 PCRF

The invention claimed is:

1. A mobile network system, comprising:
an application server being outside of a core network configured to receive an event notification from a machine type communication (MTC) device, and transmit the event notification;
a service node in the mobile core network configured to receive the event notification, determine a parameter of a characteristic change of the MTC device based on the event notification, and transmit the parameter of the characteristic change;
a control node in the mobile core network configured to receive the parameter of the characteristic change, determine a network parameter based on the parameter of a characteristic change, and transmit the network parameter; and
a base station configured to receive the network parameter, and control the MTC device based on the network parameter.

2. The mobile network system according to claim 1, wherein:
the MTC device is the smart meter,
the event notification indicates a normal or an abnormal condition, and
the network parameter is related to a state change between CONNECTED and IDLE of the MTC device.

3. A service node in the mobile core network, the service node comprising:
a receiver configured to receive an event notification from an application server;
a controller configured to determine a parameter of a characteristic change of the MTC device based on the event notification; and
a transmitter configured to transmit the parameter of the characteristic change to a control node, wherein:
the control node in the mobile core network receives the parameter of the characteristic change, determine a network parameter based on parameter of a characteristic change, and transmit the network parameter, and
a base station receives the network parameter, and controls the MTC device based on the network parameter.

4. The service node according to claim 3, wherein:
the MTC device is the smart meter,
the event notification indicates a normal or an abnormal condition, and
the network parameter is related to a state change between CONNECTED and IDLE of the MTC device.

5. A control node in a mobile core network comprising;
a receiver configured to receive a parameter of a characteristic change of a machine type communication (MTC) device from a service node;
a controller configured to determine a network parameter of the MTC device based on the parameter of the characteristic change;
a transmitter configured to transmit the network parameter to a base station,
wherein the service node receives an event notification from an application server, determine the parameter of the characteristic change of the MTC device based on the event notification, and wherein the base station controls the MTC device based on the network parameter.

6. The control node according to claim 5, wherein:
the MTC device is the smart meter,
the event notification indicates a normal or an abnormal condition, and
the network parameter is related to a state change between CONNECTED and IDLE of the MTC device.

* * * * *